(12) United States Patent
Tada

(10) Patent No.: US 11,604,543 B2
(45) Date of Patent: Mar. 14, 2023

(54) DETECTION DEVICE

(71) Applicant: Japan Display Inc., Tokyo (JP)

(72) Inventor: Masahiro Tada, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/831,914

(22) Filed: Jun. 3, 2022

(65) Prior Publication Data

US 2022/0391036 A1 Dec. 8, 2022

(30) Foreign Application Priority Data

Jun. 8, 2021 (JP) .............................. JP2021-096140

(51) Int. Cl.
*G06F 3/042* (2006.01)
*G06F 21/32* (2013.01)
*G06F 3/044* (2006.01)
*G06F 3/041* (2006.01)

(52) U.S. Cl.
CPC ............ *G06F 3/0421* (2013.01); *G06F 3/044* (2013.01); *G06F 3/04166* (2019.05); *G06F 21/32* (2013.01)

(58) Field of Classification Search
None
See application file for complete search history.

(56) References Cited

U.S. PATENT DOCUMENTS

| 2009/0027358 | A1 | 1/2009 | Hosono |
| 2017/0061635 | A1* | 3/2017 | Oberheu ................. G06T 11/60 |

FOREIGN PATENT DOCUMENTS

| JP | 2007-226045 A | 9/2007 |
| JP | 2009-032005 A | 2/2009 |

* cited by examiner

*Primary Examiner* — Stephen T. Reed
(74) *Attorney, Agent, or Firm* — K&L Gates LLP

(57) ABSTRACT

According to an aspect, a detection device includes: photodiodes; a light source; a detection circuit configured to detect detection signals output from the photodiodes; and an exposure period adjusting circuit configured to determine an exposure period of the photodiodes. A relation between an output value output from the detection circuit and the exposure period comprises a linear region and a saturated region, and a gradient of the output value with respect to the exposure period in the saturated region is smaller than a gradient of the output value with respect to the exposure period in the linear region. The exposure period adjusting circuit is configured to determine the exposure period based on a first output value output from the detection circuit in a first exposure period, a second output value output from the detection circuit in a second exposure period, and a reference output value set in advance.

11 Claims, 14 Drawing Sheets

DETECTION DEVICE

CROSS-REFERENCE TO RELATED APPLICATION

This application claims the benefit of priority from Japanese Patent Application No. 2021-096140 filed on Jun. 8, 2021, the entire contents of which are incorporated herein by reference.

BACKGROUND

1. Technical Field

What is disclosed herein relates to a detection device.

2. Description of the Related Art

Optical sensors capable of detecting fingerprint patterns and vascular patterns are known (for example, in Japanese Patent Application Laid-open Publication No. 2009-032005). Japanese Patent Application Laid-open Publication No. 2007-226045 (JP-A-2007-226045) describes an electroluminescence (EL) display device that includes a photosensor element formed in a display panel to be capable of displaying an image and capturing an image. In JP-A-2007-226045, light from a light-emitting element irradiates an object, and the photosensor can receive reflected light.

For example, in authentication devices using optical sensors, the state of an object to be detected varies with difference of, for example, the subject person, the portion to be detected, and the intensity of light from a light source. As a result, the intensity of light incident on a sensor from the object to be detected varies, and thus, the signal level detected by the sensor varies. For example, if the intensity of the light incident on the sensor is weak, the signal may be buried in noise, or if the light intensity is high, the signal may saturate. Thus, biometric information may fail to be detected well. The optimal exposure condition is difficult to be set for each object to be detected. Thus, the biometric information may fail to be detected well.

For the foregoing reasons, there is a need for a detection device capable of setting well an exposure period.

SUMMARY

According to an aspect, a detection device includes: a plurality of photodiodes; a light source configured to emit light to an object to be detected; a detection circuit configured to detect detection signals output from the photodiodes; and an exposure period adjusting circuit configured to determine an exposure period of the photodiodes. A relation between an output value output from the detection circuit and the exposure period comprises a linear region and a saturated region, and a gradient of the output value with respect to the exposure period in the saturated region is smaller than a gradient of the output value with respect to the exposure period in the linear region. The exposure period adjusting circuit is configured to determine the exposure period based on a first output value output from the detection circuit in a first exposure period, a second output value output from the detection circuit in a second exposure period, and a reference output value set in advance.

According to an aspect, a detection device includes: a plurality of photodiodes; a light source configured to emit light to an object to be detected; a detection circuit configured to detect detection signals output from the photodiodes; and an exposure period adjusting circuit configured to determine an exposure period of the photodiodes. A relation between an output value output from the detection circuit and the exposure period comprises a linear region and a saturated region, and a gradient of the output value with respect to the exposure period in the saturated region is smaller than a gradient of the output value with respect to the exposure period in the linear region. The exposure period adjusting circuit is configured to set, as an optimal exposure period, the exposure period at a curvature change point of the output value in the relation between the output value output from the detection circuit and the exposure period.

DETAILED DESCRIPTION

Figure 1:
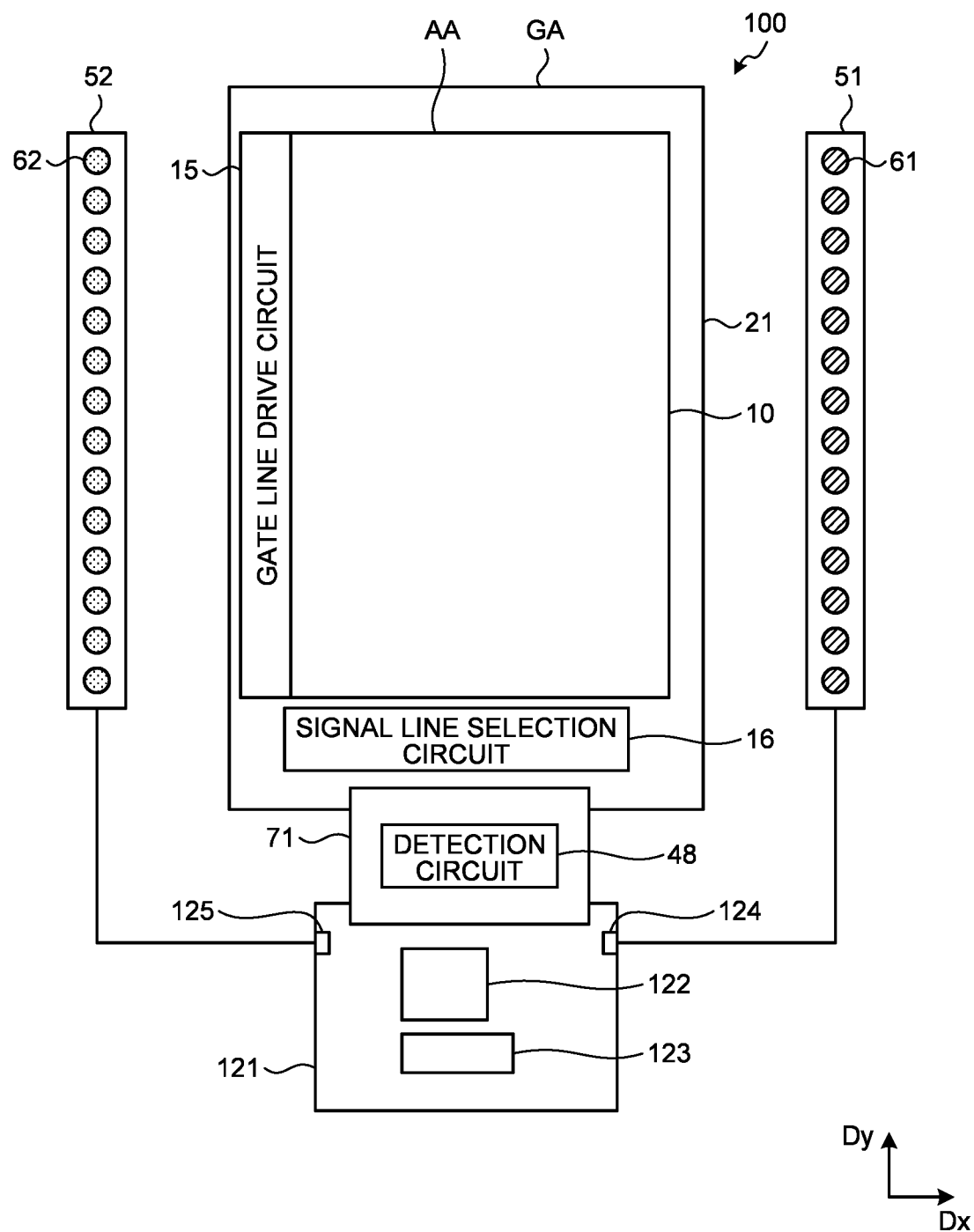
FIG. 1 is a plan view illustrating a detection device according to an embodiment.

The following describes a mode (embodiment) for carrying out the present disclosure in detail with reference to the drawings. The present disclosure is not limited to the description of the embodiment to be given below. Components described below include those easily conceivable by those skilled in the art or those substantially identical thereto. In addition, the components described below can be combined as appropriate. What is disclosed herein is merely an example, and the present disclosure naturally encompasses appropriate modifications easily conceivable by those skilled in the art while maintaining the gist of the disclosure. To further clarify the description, the drawings may schematically illustrate, for example, widths, thicknesses, and shapes of various parts as compared with actual aspects thereof. However, they are merely examples, and interpretation of the present disclosure is not limited thereto. The same component as that described with reference to an already mentioned drawing is denoted by the same reference numeral through the description and the drawings, and detailed description thereof may not be repeated where appropriate.

In this disclosure, when an element is described as being "on" another element, the element can be directly on the other element, or there can be one or more elements between the element and the other element.

Embodiment

FIG. 1 is a plan view illustrating a detection device according to an embodiment. As illustrated in FIG. 1, a detection device 100 includes a sensor base member 21, a sensor 10, a gate line drive circuit 15, a signal line selection circuit 16, a detection circuit 48, a control circuit 122, a power supply circuit 123, a first light source base member 51, a second light source base member 52, first light sources 61, and second light sources 62. The first light source base member 51 is provided with the first light sources 61 The second light source base member 52 is provided with the second light sources 62.

The sensor base member 21 is electrically coupled to a control substrate 121 through a flexible printed circuit board 71. The flexible printed circuit board 71 is provided with the detection circuit 48. The control substrate 121 is provided with the control circuit 122 and the power supply circuit 123. The control circuit 122 is, for example, a field-programmable gate array (FPGA). The control circuit 122 supplies control signals to the sensor 10, the gate line drive circuit 15, and the signal line selection circuit 16 to control a detection operation of the sensor 10. The control circuit 122 supplies control signals to the first and the second light sources 61 and 62 to control lighting and non-lighting of the first and the second light sources 61 and 62. The power supply circuit 123 supplies voltage signals including, for example, a sensor power supply signal (sensor power supply voltage) VDDSNS (refer to FIG. 4) to the sensor 10, the gate line drive circuit 15, and the signal line selection circuit 16. The power supply circuit 123 supplies a power supply voltage to the first and the second light sources 61 and 62.

The sensor base member 21 has a detection area AA and a peripheral area GA. The detection area AA is an area provided with a plurality of photodiodes PD (refer to FIG. 4) included in the sensor 10. The peripheral area GA is an area between the outer perimeter of the detection area AA and ends of the sensor base member 21 and is an area not provided with the photodiodes PD.

The gate line drive circuit 15 and the signal line selection circuit 16 are provided in the peripheral area GA. Specifically, the gate line drive circuit 15 is provided in an area extending along a second direction Dy in the peripheral area GA. The signal line selection circuit 16 is provided in an area extending along a first direction Dx in the peripheral area GA, and is provided between the sensor 10 and the detection circuit 48.

The first direction Dx is one direction in a plane parallel to the sensor base member 21. The second direction Dy is one direction in the plane parallel to the sensor base member 21 and is a direction orthogonal to the first direction Dx. The second direction Dy may non-orthogonally intersect the first direction Dx. A third direction Dz is a direction orthogonal to the first direction Dx and the second direction Dy and is a direction normal to the sensor base member 21.

The first light sources 61 are provided on the first light source base member 51 and are arranged along the second direction Dy. The second light sources 62 are provided on the second light source base member 52, and are arranged along the second direction Dy. The first light source base member 51 and the second light source base member 52 are electrically coupled, through respective terminals 124 and 125 provided on the control substrate 121, to the control circuit 122 and the power supply circuit 123.

For example, inorganic light-emitting diodes (LEDs) or organic electroluminescence (EL) devices (organic light-emitting diodes: OLEDs) are used as the first and the second light sources 61 and 62. The first and the second light sources 61 and 62 emit first and second light, respectively, having different wavelengths.

The first light emitted from the first light sources 61 is mainly reflected on a surface of an object to be detected, such as a finger Fg, and is incident on the sensor 10. As a result, the sensor 10 can detect a fingerprint by detecting a shape of asperities on the surface of the finger Fg or the like. The second light emitted from the second light sources 62 is mainly reflected in the finger Fg or the like, or transmitted through the finger Fg or the like, and is incident on the sensor 10. As a result, the sensor 10 can detect information on a living body such as the finger Fg or the like. Examples of the information on the living body include a pulse wave, pulsation, and a vascular image of the finger or a palm. That is, the detection device 100 may be configured as a fingerprint detection device to detect a fingerprint or a vein detection device to detect a vascular pattern of, for example, veins.

The first light may have a wavelength of from 500 nm to 600 nm, for example, a wavelength of approximately 550 nm, and the second light may have a wavelength of from 780 nm to 950 nm, for example, a wavelength of approximately 850 nm. In this case, the first light is blue or green visible light, and the second light is infrared light. The sensor 10 can detect a fingerprint based on the first light emitted from the first light sources 61. The second light emitted from the second light sources 62 is reflected in the object to be detected such as a finger Fg, or transmitted through or absorbed by the finger Fg or the like, and is incident on the sensor 10. As a result, the sensor 10 can detect the pulse wave or the vascular image (vascular pattern) as the information on the living body in the finger Fg or the like.

Alternatively, the first light may have a wavelength of from 600 nm to 700 nm, for example, approximately 660 nm, and the second light may have a wavelength of from 780 nm to 900 nm, for example, approximately 850 nm. In this case, the sensor 10 can detect a blood oxygen saturation level in addition to the pulse wave, the pulsation, and the vascular image as the information on the living body based on the first light emitted from the first light sources 61 and the second light emitted from the second light sources 62. Thus, the detection device 100 includes the first and the second light sources 61 and 62, and therefore, can detect the various information on the living body by performing the detection based on the first light and the detection based on the second light.

The arrangement of the first and the second light sources 61 and 62 illustrated in FIG. 1 is merely an example, and may be changed as appropriate. The detection device 100 is provided with a plurality of types of light sources (first and second light sources 61 and 62) as the light sources. However, the light sources are not limited thereto, and may be of one type. For example, the first and the second light sources 61 and 62 may be arranged on each of the first and the second light source base members 51 and 52. The first and the second light sources 61 and 62 may be provided on one or three or more light source base members. At least one light source only needs to be disposed.

Figure 2:
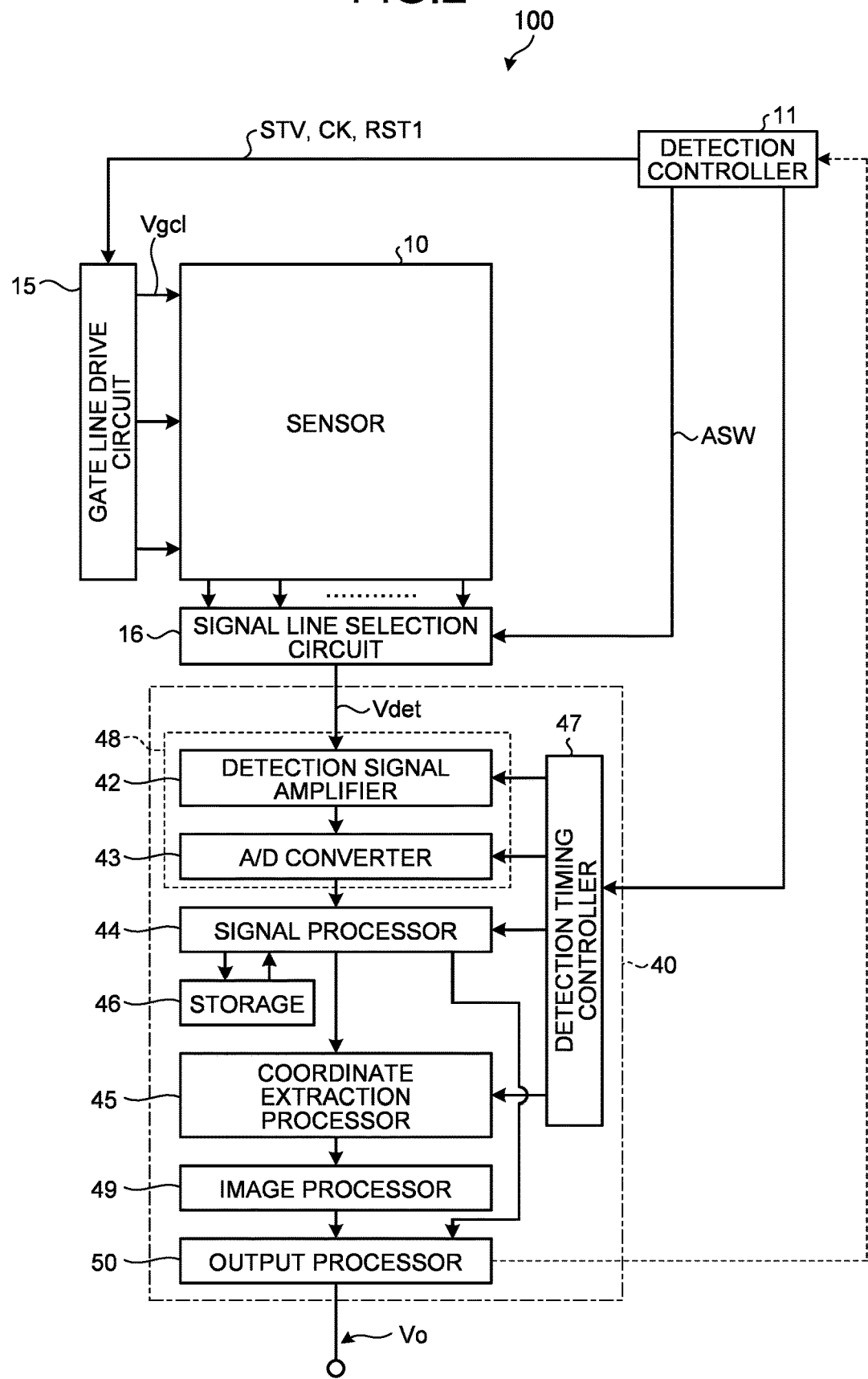
FIG. 2 is a block diagram illustrating a configuration example of the detection device according to the embodiment.

FIG. 2 is a block diagram illustrating a configuration example of the detection device according to the embodiment. As illustrated in FIG. 2, the detection device 100 further includes a detection controller 11 and a detector 40 (detection signal processing circuit). The control circuit 122 includes one, some, or all functions of the detection controller 11. The control circuit 122 also includes one, some, or all functions of the detector 40 except those of the detection circuit 48.

The sensor 10 includes the photodiodes PD. Each of the photodiodes PD included in the sensor 10 is an optical sensor that outputs an electric signal corresponding to light irradiating the photodiode PD as a detection signal Vdet to the signal line selection circuit 16. The sensor 10 performs the detection according to a gate drive signal Vgcl supplied from the gate line drive circuit 15.

The detection controller 11 is a circuit that supplies respective control signals to the gate line drive circuit 15, the signal line selection circuit 16, and the detector 40 to control operations thereof. The detection controller 11 supplies various control signals such as a start signal STV, a clock signal CK, and a reset signal RST1 to the gate line drive circuit 15. The detection controller 11 also supplies various control signals such as a selection signal ASW to the signal line selection circuit 16. The detection controller 11 supplies various control signals to the first and the second light sources 61 and 62 to control the lighting and non-lighting of the respective first and second light sources 61 and 62.

The gate line drive circuit 15 is a circuit that drives a plurality of gate lines GCL (refer to FIG. 3) based on the various control signals. The gate line drive circuit 15 sequentially or simultaneously selects the gate lines GCL, and supplies the gate drive signals Vgcl to the selected gate lines GCL. By this operation, the gate line drive circuit 15 selects the photodiodes PD coupled to the gate lines GCL.

Figure 3:
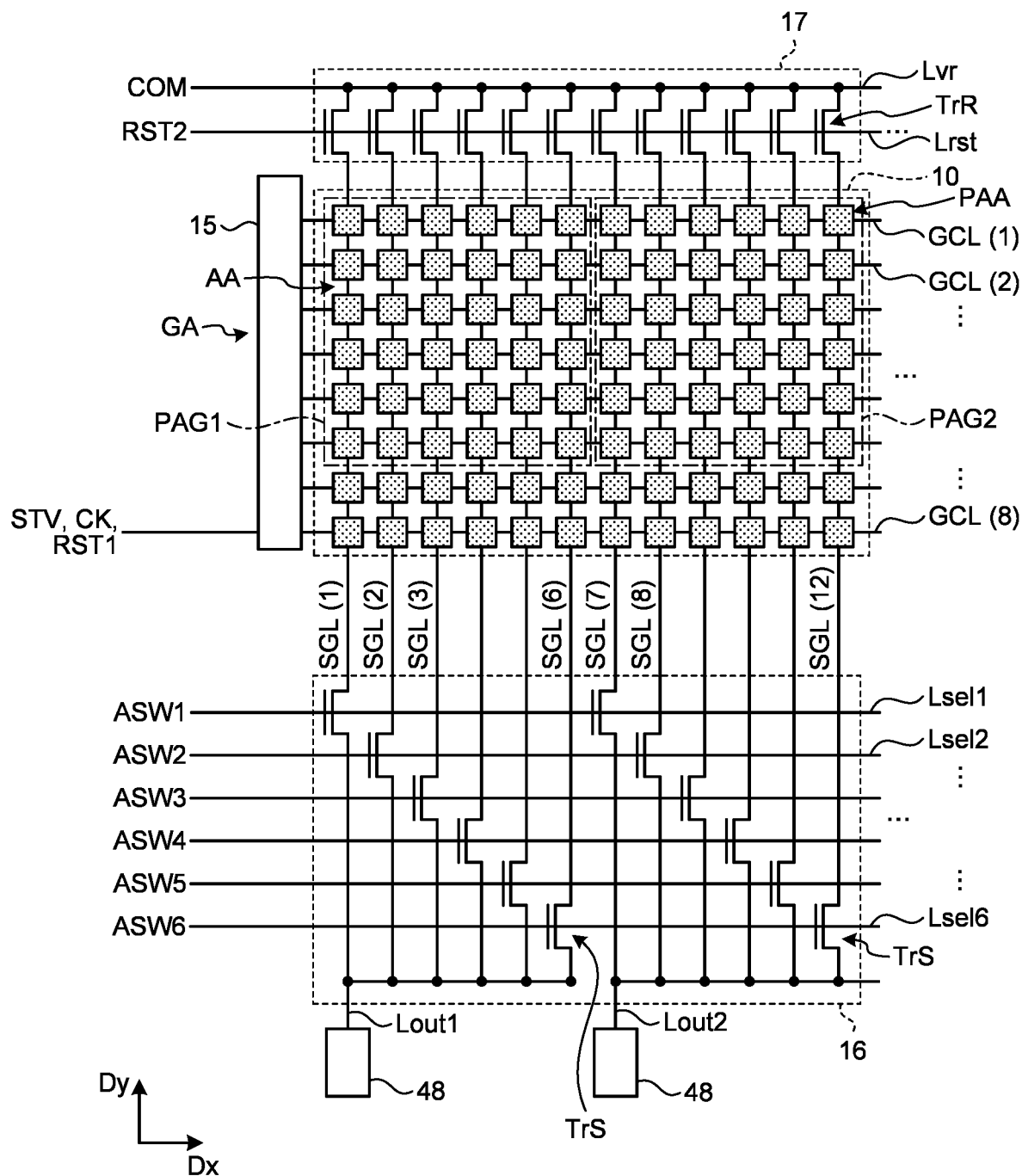
FIG. 3 is a circuit diagram illustrating the detection device.

The signal line selection circuit 16 is a switch circuit that sequentially or simultaneously selects a plurality of signal lines SGL (refer to FIG. 3). The signal line selection circuit 16 is, for example, a multiplexer. The signal line selection circuit 16 couples the selected signal lines SGL to the detection circuit 48 based on the selection signal ASW supplied from the detection controller 11. By this operation, the signal line selection circuit 16 outputs the detection signals Vdet of the photodiodes PD to the detector 40.

The detector 40 includes the detection circuit 48, a signal processor 44 (signal processing circuit), a coordinate extraction processor (coordinate extraction circuit) 45, a storage (storage circuit) 46, a detection timing controller (detection timing control circuit) 47, an image processor (image processing circuit) 49, and an output processor (output processing circuit) 50. Based on a control signal supplied from the detection controller 11, the detection timing controller 47 controls the detection circuit 48, the signal processor 44, the coordinate extraction processor 45, and the image processor 49 so as to operate in synchronization with one another.

The detection circuit 48 is, for example, an analog front-end (AFE) circuit. The detection circuit 48 is a signal processing circuit having functions of at least a detection signal amplifier 42 and an analog-to-digital (A/D) converter 43. The detection signal amplifier 42 amplifies the detection signals Vdet. The A/D converter 43 converts analog signals output from the detection signal amplifier 42 into digital signals.

The signal processor 44 is a logic circuit that detects a predetermined physical quantity received by the sensor 10 based on an output signal of the detection circuit 48. The signal processor 44 can detect the asperities on the surface of the finger Fg or the palm based on the signals from the detection circuit 48 when the finger Fg is in contact with or in proximity to a detection surface. The signal processor 44 can also detect the information on the living body based on the signals from the detection circuit 48. Examples of the information on the living body include the vascular image, the pulse wave, the pulsation, and the blood oxygen level of the finger Fg or the palm.

The signal processor 44 may also perform processing of acquiring the detection signals Vdet (information on the living body) simultaneously detected by the photodiodes PD, and averaging the detection signals Vdet. In this case, the detector 40 can perform stable detection by reducing measurement errors caused by noise or relative positional misalignment between the object to be detected, such as a finger Fg, and the sensor 10.

The storage 46 temporarily stores therein a signal calculated by the signal processor 44. The storage 46 may be, for example, a random-access memory (RAM) or a register circuit.

The coordinate extraction processor 45 is a logic circuit that obtains detected coordinates of the asperities on the surface of the finger or the like when the contact or the proximity of the finger is detected by the signal processor 44. The coordinate extraction processor 45 is also a logic circuit that obtains detected coordinates of blood vessels of the finger Fg or the palm. The image processor 49 combines the detection signals Vdet output from the respective photodiodes PD of the sensor 10 to generate two-dimensional information indicating the shape of the asperities on the surface of the finger Fg or the like and two-dimensional information indicating the shape of the blood vessels of the finger Fg or the palm. The coordinate extraction processor 45 may output the detection signals Vdet as sensor output voltages Vo instead of calculating the detected coordinates. A case can be considered where the detector 40 does not include the coordinate extraction processor 45 and the image processor 49.

The output processor 50 serves as a processor that performs processing based on the outputs from the photodiodes PD. Specifically, the output processor 50 of the embodiment outputs the sensor output voltages Vo including at least pulse wave data based on at least the detection signals Vdet acquired by the signal processor 44. In the embodiment, the signal processor 44 outputs data indicating a variation (amplitude) in output of the detection signal Vdet of each of the photodiodes PD (described later), and the output processor 50 determines which outputs are to be employed as the sensor output voltages Vo. However, the signal processor 44 or the output processor 50 may perform both the above-described operations. The output processor 50 may include, for example, the detected coordinates obtained by the coordinate extraction processor 45 and the two-dimensional information generated by the image processor 49 in the sensor output voltages Vo. The function of the output processor 50 may be integrated into another component (such as the image processor 49).

The following describes a circuit configuration example of the detection device 100. FIG. 3 is a circuit diagram illustrating the detection device. As illustrated in FIG. 3, the sensor 10 has a plurality of partial detection areas PAA arranged in a matrix having a row-column configuration. Each of the partial detection areas PAA is provided with the photodiode PD.

The gate lines GCL extend in the first direction Dx, and are coupled to the partial detection areas PAA arranged in the first direction Dx. A plurality of gate lines GCL(1), GCL(2), . . . , GCL(8) are arranged in the second direction Dy, and are each coupled to the gate line drive circuit 15. In the following description, the gate lines GCL(1), GCL(2), . . . , GCL(8) will each be simply referred to as the gate line GCL when they need not be distinguished from one another. For ease of understanding of the description, FIG. 3 illustrates eight gate lines GCL. However, this is merely an example, and M gate lines GCL (where M is eight or larger, and is, for example, 256) may be arranged.

The signal lines SGL extend in the second direction Dy, and are coupled to the photodiodes PD of the partial detection areas PAA arranged in the second direction Dy. A plurality of signal lines SGL(1), SGL(2), . . . , SGL(12) are arranged in the first direction Dx, and are each coupled to the signal line selection circuit 16 and a reset circuit 17. In the following description, the signal lines SGL(1), SGL(2), . . . , SGL(12) will each be simply referred to as the signal line SGL when they need not be distinguished from one another.

For ease of understanding of the description, 12 signal lines SGL are illustrated. However, this is merely an example, and N signal lines SGL (where N is 12 or larger, and is, for example, 252) may be arranged. In FIG. 3, the sensor 10 is provided between the signal line selection circuit 16 and the reset circuit 17. The present disclosure is not limited thereto. The signal line selection circuit 16 and the reset circuit 17 may be coupled to ends in the same direction of the signal lines SGL. The substantial area of one sensing region is, for example, substantially 50×50 μm². The resolution of the detection area AA is, for example, substantially 508 pixels per inch (ppi). The number of the sensing regions arranged in the detection area AA is, for example, 252 cells×256 cells. The area of the detection area AA is, for example, 12.6×12.8 mm².

The gate line drive circuit 15 receives the various control signals such as the start signal STV, the clock signal CK, and the reset signal RST1 from the control circuit 122 (refer to FIG. 1). The gate line drive circuit 15 sequentially selects the gate lines GCL(1), GCL(2), . . . , GCL(8) in a time-division manner based on the various control signals. The gate line drive circuit 15 supplies the gate drive signal Vgcl to the selected one of the gate lines GCL. This operation supplies the gate drive signal Vgcl to a plurality of first switching elements Tr coupled to the gate line GCL, and corresponding ones of the partial detection areas PAA arranged in the first direction Dx are selected as detection targets.

The gate line drive circuit 15 may perform different driving for each of detection modes including the detection of a fingerprint and the detection of different items of the information on the living body (such as the pulse wave, the pulsation, the blood vessel image, and the blood oxygen level). For example, the gate line drive circuit 15 may drive more than one of the gate lines GCL collectively.

The signal line selection circuit 16 includes a plurality of selection signal lines Lsel, a plurality of output signal lines Lout, and third switching elements TrS. The third switching elements TrS are provided corresponding to the signal lines SGL. Six signal lines SGL(1), SGL(2), . . . , SGL(6) are coupled to a common output signal line Lout1. Six signal lines SGL(7), SGL(8), . . . , SGL(12) are coupled to a common output signal line Lout2. The output signal lines Lout1 and Lout2 are each coupled to the detection circuit 48.

The signal lines SGL(1), SGL(2), . . . , SGL(6) are grouped into a first signal line block, and the signal lines SGL(7), SGL(8), . . . , SGL(12) are grouped into a second signal line block. The selection signal lines Lsel are coupled to the gates of the respective third switching elements TrS included in one of the signal line blocks. One of the selection signal lines Lsel is coupled to the gates of the third switching elements TrS in the signal line blocks.

The control circuit 122 (refer to FIG. 1) sequentially supplies the selection signal ASW to the selection signal lines Lsel. As a result, through the operations of the third switching elements TrS, the signal line selection circuit 16 sequentially selects the signal lines SGL in one of the signal line blocks in a time-division manner. The signal line selection circuit 16 selects one of the signal lines SGL in each of the signal line blocks. With the above-described configuration, the detection device 100 can reduce the number of integrated circuits (ICs) including the detection circuit 48 or the number of terminals of the ICs. The signal line selection circuit 16 may couple more than one of the signal lines SGL collectively to the detection circuit 48.

As illustrated in FIG. 3, the reset circuit 17 includes a reference signal line Lvr, a reset signal line Lrst, and fourth switching elements TrR. The fourth switching elements TrR are provided correspondingly to the signal lines SGL. The reference signal line Lvr is coupled to either the sources or the drains of the fourth switching elements TrR. The reset signal line Lrst is coupled to the gates of the fourth switching elements TrR.

The control circuit 122 supplies a reset signal RST2 to the reset signal line Lrst. This operation turns on the fourth switching elements TrR to electrically couple the signal lines SGL to the reference signal line Lvr. The power supply circuit 123 supplies a reference signal COM to the reference signal line Lvr. This operation supplies the reference signal COM to a capacitive element Ca (refer to FIG. 4) included in each of the partial detection areas PAA.

Figure 4:
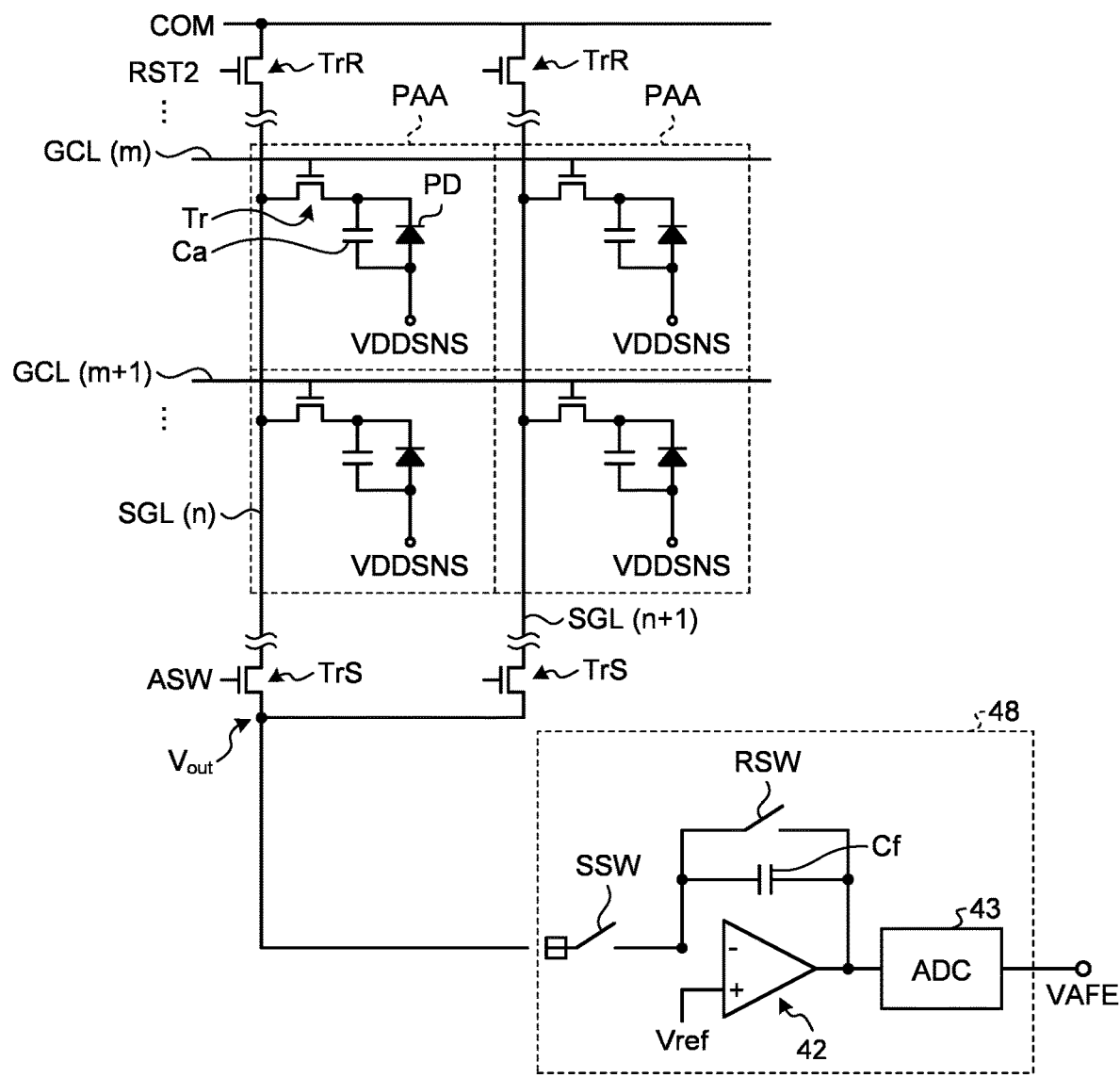
FIG. 4 is a circuit diagram illustrating a plurality of partial detection areas.

FIG. 4 is a circuit diagram illustrating the partial detection areas. FIG. 4 also illustrates a circuit configuration of the detection circuit 48. As illustrated in FIG. 4, each of the partial detection areas PAA includes the photodiode PD, the capacitive element Ca, and a corresponding one of the first switching elements Tr. The capacitive element Ca is capacitance (sensor capacitance) generated in the photodiode PD, and is equivalently coupled in parallel to the photodiode PD.

FIG. 4 illustrates two gate lines GCL(m) and GCL(m+1) arranged in the second direction Dy among the gate lines GCL. FIG. 4 also illustrates two signal lines SGL(n) and SGL(n+1) arranged in the first direction Dx among the signal lines SGL. The partial detection area PAA is an area surrounded by the gate lines GCL and the signal lines SGL.

Each of the first switching elements Tr is provided correspondingly to the photodiode PD. The first switching element Tr includes a thin-film transistor, and in this example, includes an n-channel metal oxide semiconductor (MOS) thin-film transistor (TFT).

The gates of the first switching elements Tr belonging to the partial detection areas PAA arranged in the first direction Dx are coupled to the gate line GCL. The sources of the first switching elements Tr belonging to the partial detection areas PAA arranged in the second direction Dy are coupled to the signal line SGL. The drain of the first switching element Tr is coupled to the cathode of the photodiode PD and the capacitive element Ca.

The anode of the photodiode PD is supplied with the sensor power supply signal VDDSNS from the power supply circuit 123. The signal line SGL and the capacitive element Ca are supplied with the reference signal COM that serves as an initial potential of the signal line SGL and the capacitive element Ca from the power supply circuit 123.

When the partial detection area PAA is irradiated with light, a current corresponding to the amount of the light flows through the photodiode PD. As a result, an electric charge is stored in the capacitive element Ca. After the first switching element Tr is turned on, a current corresponding to the electric charge stored in the capacitive element Ca flows through the signal line SGL. The signal line SGL is coupled to the detection circuit 48 through a corresponding one of the third switching elements TrS of the signal line selection circuit 16. Thus, the detection device 100 can detect a signal corresponding to the amount of the light irradiating the photodiode PD in each of the partial detection areas PAA or each block unit PAG.

During a reading period Pdet (refer to FIG. 7), a switch SSW of the detection circuit 48 is turned on, and the detection circuit 48 is coupled to the signal lines SGL. The detection signal amplifier 42 of the detection circuit 48 converts a variation of a current supplied from the signal lines SGL into a variation of a voltage, and amplifies the result. A reference potential (Vref) having a fixed potential is supplied to a non-inverting input portion (+) of the detection signal amplifier 42, and the signal lines SGL are coupled to an inverting input terminal (−) of the detection signal amplifier 42. In the embodiment, the same signal as the reference signal COM is supplied as the reference potential (Vref). The detection signal amplifier 42 includes a capacitive element Cf and a reset switch RSW. During a reset period Prst (refer to FIG. 7), the reset switch RSW is turned on, and an electric charge of the capacitive element Cf is reset. During the reading period Pdet (refer to FIG. 7), a voltage corresponding to the electric charge stored in the capacitive element Cf is output as an output voltage VAFE (output value) from the detection circuit 48.

Figure 5:
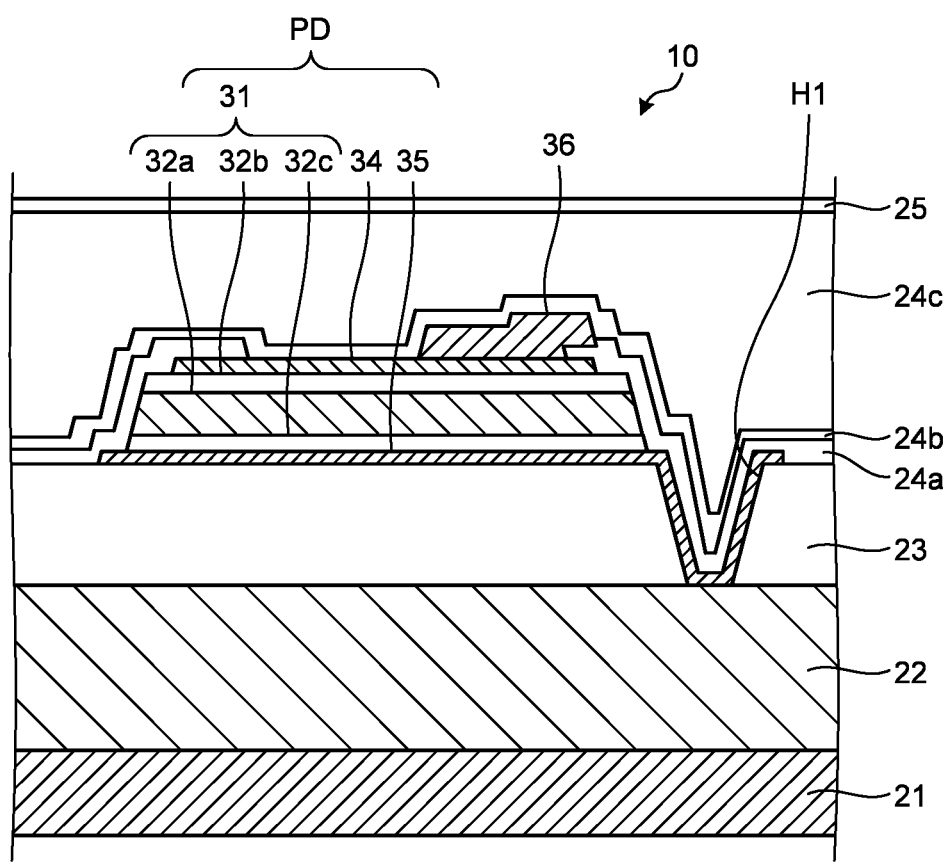
FIG. 5 is a sectional view illustrating a schematic sectional configuration of a sensor.

The following describes a configuration of the photodiode PD. FIG. 5 is a sectional view illustrating a schematic sectional configuration of the sensor. As illustrated in FIG. 5, the sensor 10 includes the sensor base member 21, a TFT layer 22, an insulating layer 23, the photodiode PD, and insulating layers 24a, 24b, 24c, and 25. The sensor base member 21 is an insulating base member, and is made using, for example, glass or a resin material. The sensor base member 21 is not limited to having a flat plate shape, and may have a curved surface. In this case, the sensor base member 21 can be a film-like resin. The sensor base member 21 has a first surface and a second surface on the side opposite to the first surface. The TFT layer 22, the insulating layer 23, the photodiode PD, and the insulating layers 24a, 24b, 24c, and 25 are stacked in this order on the first surface.

The TFT layer 22 is provided with circuits such as the gate line drive circuit 15 and the signal line selection circuit 16 described above. The TFT layer 22 is also provided with TFTs, such as the first switching elements Tr, and various types of wiring such as the gate lines GCL and signal lines SGL. The sensor base member 21 and the TFT layer 22 are a drive circuit board that drives the sensing region for each predetermined detection area and are also called a backplane or an array substrate.

The insulating layer 23 is an organic insulating layer and is provided on the TFT layer 22. The insulating layer 23 is a planarizing layer that planarizes asperities formed by the first switching elements Tr formed in the TFT layer 22 and by various conductive layers.

The photodiode PD is provided on the insulating layer 23. The photodiode PD includes a lower electrode 35, a semiconductor layer 31, and an upper electrode 34, which are stacked in this order.

The lower electrode 35 is provided on the insulating layer 23, and is electrically coupled to the first switching element Tr in the TFT layer 22 through a contact hole H1. The lower electrode 35 is the cathode of the photodiode PD and is an electrode for reading the detection signal Vdet. The lower electrode 35 is formed of, for example, a light-transmitting conductive material such as indium tin oxide (ITO).

The semiconductor layer 31 is formed of amorphous silicon (a-Si). The semiconductor layer 31 includes an i-type semiconductor layer 32a, a p-type semiconductor layer 32b, and an n-type semiconductor layer 32c. The i-type semiconductor layer 32a, the p-type semiconductor layer 32b, and the n-type semiconductor layer 32c constitute a specific example of a photoelectric conversion element. In FIG. 5, the n-type semiconductor layer 32c, the i-type semiconductor layer 32a, and the p-type semiconductor layer 32b are stacked in this order in a direction orthogonal to a surface of the sensor base member 21. However, the semiconductor layer 31 may have a reversed configuration, that is, the p-type semiconductor layer 32b, the i-type semiconductor layer 32a, and the n-type semiconductor layer 32c may be stacked in this order. The semiconductor layer 31 may be a photoelectric conversion element formed of organic semiconductors.

The a-Si of the n-type semiconductor layer 32c is doped with impurities to form an n+ region. The a-Si of the p-type semiconductor layer 32b is doped with impurities to form a p+ region. The i-type semiconductor layer 32a is, for example, a non-doped intrinsic semiconductor, and has lower conductivity than that of the p-type semiconductor layer 32b and the n-type semiconductor layer 32c.

The upper electrode 34 is the anode of the photodiode PD, and is an electrode for supplying the power supply signal VDDSNS to a photoelectric conversion layer. The upper electrode 34 is a light-transmitting conductive layer of, for example, ITO, and a plurality of the upper electrodes 34 are provided for each of the photodiodes PD.

The insulating layers 24a and 24b are provided on the insulating layer 23. The insulating layer 24a covers the periphery of the upper electrode 34, and is provided with an opening in a position overlapping the upper electrode 34. Coupling wiring 36 is coupled to the upper electrode 34 at a portion of the upper electrode 34 not provided with the insulating layer 24a. The insulating layer 24b is provided on the insulating layer 24a so as to cover the upper electrode 34 and the coupling wiring 36. The insulating layer 24c serving as a planarizing layer is provided on the insulating layer 24b. The insulating layer 25 is provided on the insulating layer 24c. However, the insulating layer 25 need not be provided.

Figure 6:
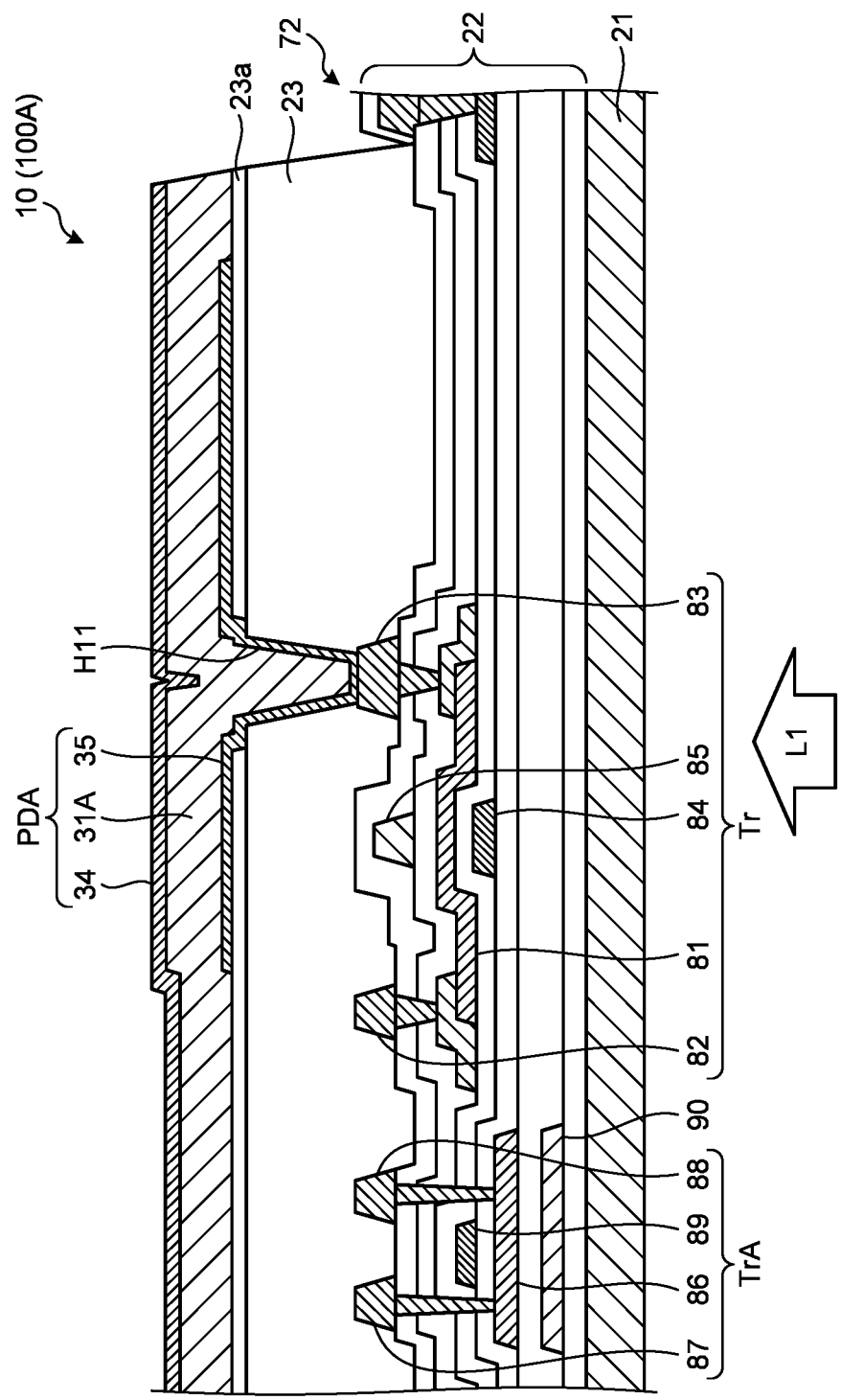
FIG. 6 is a sectional view illustrating a schematic sectional configuration of the sensor of a detection device according to a first modification.

FIG. 6 is a sectional view illustrating a schematic sectional configuration of the sensor of a detection device according to a first modification. As illustrated in FIG. 6, in a detection device 100A of the first modification, a photodiode PDA is provided above an insulating layer 23a. The insulating layer 23a is an inorganic insulating layer provided so as to cover the insulating layer 23, and is formed of, for example, silicon nitride (SiN). The photodiode PDA includes a photoelectric conversion layer 31A, the lower electrode 35 (cathode electrode), and the upper electrode 34 (anode electrode). The lower electrode 35, the photoelectric conversion layer 31A, and the upper electrode 34 are stacked in this order in a direction orthogonal to the first surface of the sensor base member 21.

The photoelectric conversion layer 31A changes in characteristics (for example, voltage-current characteristics and a resistance value) depending on light emitted thereto. An organic material is used as a material of the photoelectric conversion layer 31A. Specifically, as the photoelectric conversion layer 31A, low-molecular-weight organic materials can be used including, for example, fullerene ($C_{60}$), phenyl-$C_{61}$-butyric acid methyl ester (PCBM), copper phthalocyanine (CuPc), fluorinated copper phthalocyanine ($F_{16}$CuPc), rubrene (5,6,11,12-tetraphenyltetracene), and PDI (a derivative of perylene).

The photoelectric conversion layer 31A can be formed by a vapor deposition process (dry process) using the above-listed low-molecular-weight organic materials. In this case, the photoelectric conversion layer 31A may be, for example, a multilayered film of CuPc and $F_{16}$CuPc, or a multilayered film of rubrene and $C_{60}$. The photoelectric conversion layer 31A can also be formed by a coating process (wet process). In this case, the photoelectric conversion layer 31A is made using a material obtained by combining the above-listed low-molecular-weight organic materials with high-molecular-weight organic materials. As the high-molecular-weight organic materials, for example, poly(3-hexylthiophene) (P3HT) and F8-alt-benzothiadiazole (F8BT) can be used. The photoelectric conversion layer 31A can be a film in the state of a mixture of P3HT and PCBM or a film in the state of a mixture of F8BT and PDI.

The lower electrode 35 faces the upper electrode 34 with the photoelectric conversion layer 31A interposed therebetween. The upper electrode 34 is formed of, for example, a light-transmitting conductive material such as ITO. For example, a metal material such as silver (Ag) or aluminum (Al) is used as the lower electrode 35. Alternatively, the lower electrode 35 may be made of an alloy material containing at least one or more of these metal materials.

The lower electrode 35 can be formed as a light-transmitting transflective electrode by controlling the film thickness of the lower electrode 35. For example, the lower electrode 35 is formed of a thin Ag film having a thickness of 10 nm so as to have light transmittance of approximately 60%. In this case, the photodiode PDA can detect light emitted from both sides of the sensor base member 21, for example, both light L1 emitted from the second surface side and light emitted from the first surface side.

Although not illustrated in FIG. 6, a protective film may be provided so as to cover the upper electrode 34. The protective film is a passivation film and is provided to protect the photodiode PDA.

As illustrated in FIG. 6, the TFT layer 22 is provided with the first switching element Tr electrically coupled to the photodiode PDA. The first switching element Tr includes a semiconductor layer 81, a source electrode 82, a drain electrode 83, and gate electrodes 84 and 85. The lower electrode 35 of the photodiode PDA is electrically coupled to the drain electrode 83 of the first switching element Tr through a contact hole H11 provided in the insulating layers 23 and 23a.

The first switching element Tr has what is called a dual-gate structure provided with the gate electrodes 84 and 85 on the upper and lower sides of the semiconductor layer 81. However, the first switching element Tr is not limited to this structure and may have a top-gate structure or a bottom-gate structure.

FIG. 6 schematically illustrates a second switching element TrA and a terminal 72 provided in the peripheral area GA. The second switching element TrA is, for example, a switching element provided in the gate line drive circuit 15 (refer to FIG. 1). The second switching element TrA includes a semiconductor layer 86, a source electrode 87, a drain electrode 88, and a gate electrode 89. The second switching element TrA has what is called a top-gate structure provided with the gate electrode 89 on the upper side of the semiconductor layer 86. A light-blocking layer 90 is provided between the semiconductor layer 86 and the sensor base member 21 on the lower side of the semiconductor layer 86. The second switching element TrA is, however, not limited to the above-described structure, and may have a bottom-gate structure or a dual-gate structure.

The semiconductor layer 81 of the first switching element Tr is provided in a layer different from that of the semiconductor layer 86 of the second switching element TrA. The semiconductor layer 81 of the first switching element Tr is formed of, for example, an oxide semiconductor. The semiconductor layer 86 of the second switching element TrA is formed of, for example, polysilicon.

Figure 7:
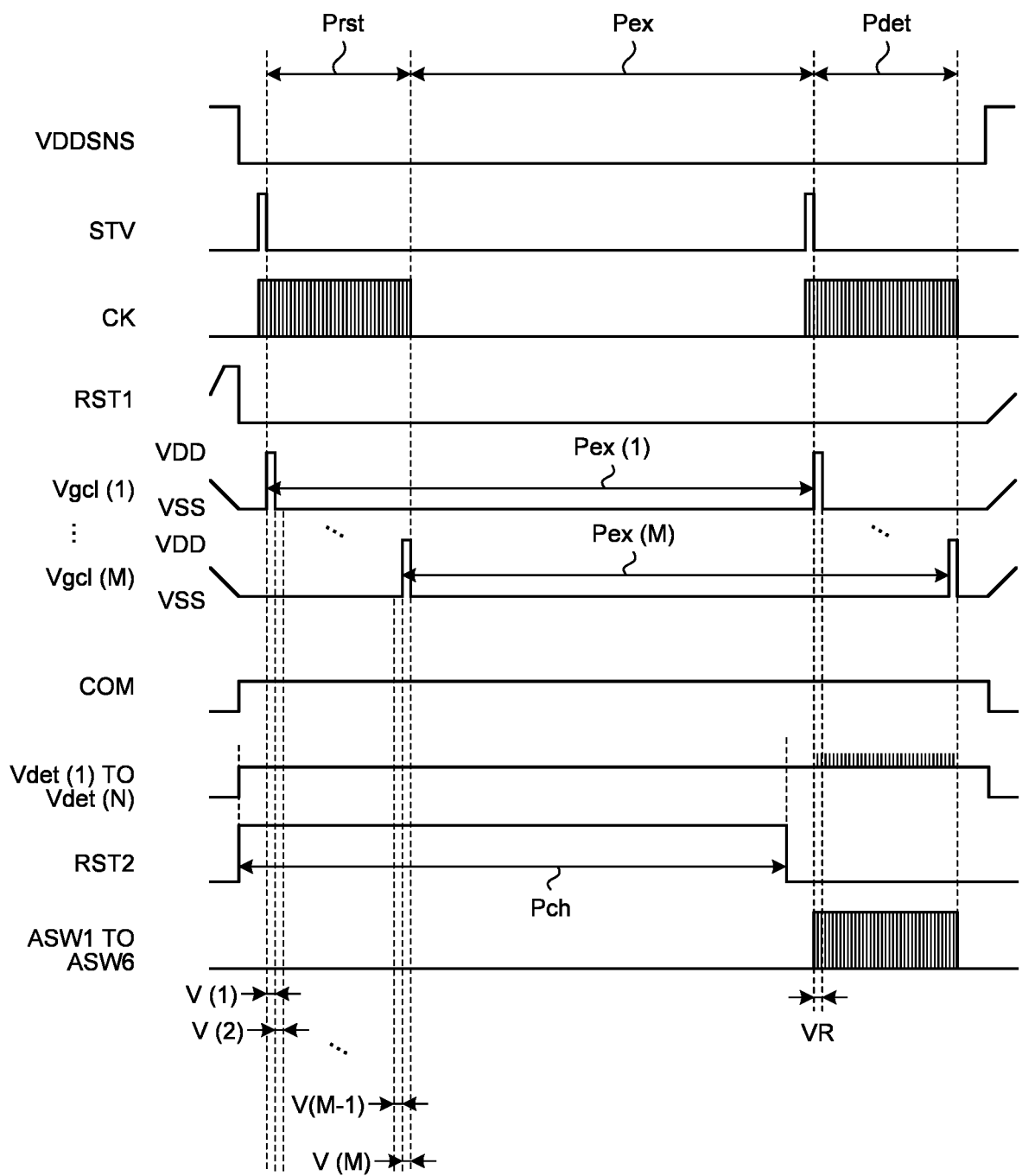
FIG. 7 is a timing waveform diagram illustrating an operation example of the detection device.

The following describes an operation example of the detection device 100 of the present embodiment. FIG. 7 is a timing waveform diagram illustrating the operation example of the detection device. As illustrated in FIG. 7, the detection device 100 has the reset period Prst, an exposure period Pex, and the reading period Pdet. The power supply circuit 123 supplies the sensor power supply signal VDDSNS to the anode of the photodiode PD over the reset period Prst, the exposure period Pex, and the reading period Pdet. The sensor power supply signal VDDSNS is a signal that applies a reverse bias between the anode and the cathode of the photodiode PD. For example, the reference signal COM at substantially 0.75 V is applied to the cathode of the photodiode PD, and the sensor power supply signal VDDSNS at substantially −1.25 V is applied to the anode of the photodiode PD. As a result, a reverse bias at substantially 2.0 V is applied between the anode and the cathode. The control circuit 122 sets the reset signal RST2 to "H", and then, supplies the start signal STV and the clock signal CK to the gate line drive circuit 15 to start the reset period Prst. During the reset period Prst, the control circuit 122 supplies the reference signal COM to the reset circuit 17, and uses the reset signal RST2 to turn on each of the fourth switching elements TrR for supplying a reset voltage. This operation supplies the reference signal COM as the reset voltage to each of the signal lines SGL. The reference signal COM is set to, for example, 0.75 V.

During the reset period Prst, the gate line drive circuit 15 sequentially selects each of the gate lines GCL based on the start signal STV, the clock signal CK, and the reset signal RST1. The gate line drive circuit 15 sequentially supplies the gate drive signals Vgcl {Vgcl(1), . . . , Vgcl(M)} to the gate lines GCL. The gate drive signal Vgcl has a pulsed waveform having a power supply voltage VDD serving as a high-level voltage and a power supply voltage VSS serving as a low-level voltage. In FIG. 7, M gate lines GCL (where M is, for example, 256) are provided, and the gate drive signals Vgcl(1), . . . , Vgcl(M) are sequentially supplied to the respective gate lines GCL. Thus, the first switching elements Tr are sequentially brought into a conducting state and supplied with the reset voltage on a row-by-row basis. For example, a voltage 0.75 V of the reference signal COM is supplied as the reset voltage.

Thus, during the reset period Prst, the capacitive elements Ca of all the partial detection areas PAA are sequentially electrically coupled to the signal lines SGL, and are supplied with the reference signal COM. As a result, the capacitance of the capacitive elements Ca is reset. The capacitance of the capacitive elements Ca of some of the partial detection areas PAA can be reset by partially selecting the gate lines GCL and the signal lines SGL.

Examples of the exposure timing control method include a control method of exposure during non-selection of gate lines and a full-time control method of exposure. In the control method of exposure during non-selection of gate lines, the gate drive signals {Vgcl(1), . . . , Vgcl(M)} are sequentially supplied to all the gate lines GCL coupled to the photodiodes PD serving as the detection targets, and all the photodiodes PD serving as the detection targets are supplied with the reset voltage. Then, after all the gate lines GCL coupled to the photodiodes PD serving as the detection targets are set to a low voltage (the first switching elements Tr are turned off), the exposure starts and the exposure is performed during the exposure period Pex. After the exposure ends, the gate drive signals {Vgcl(1), . . . , Vgcl(M)} are sequentially supplied to the gate lines GCL coupled to the photodiodes PD serving as the detection targets as described above, and reading is performed during the reading period Pdet. In the full-time control method of exposure, control for performing the exposure can also be performed during the reset period Prst and the reading period Pdet (full-time exposure control). In this case, the exposure period Pex(1) starts after the gate drive signal Vgcl(1) is supplied to the gate line GCL during the reset period Prst. The term "exposure periods Pex {(1), . . . , (M)}" refers to periods during which the capacitive elements Ca are charged from the photodiodes PD. The electric charge stored in the capacitive element Ca during the reset period Prst causes a reverse directional current (from cathode to anode) to flow through the photodiode PD due to light irradiation, and the potential difference in the capacitive element Ca decreases. The start timing and the end timing of the actual exposure periods Pex(1), . . . , Pex(M) are different among the partial detection areas PAA corresponding to the gate lines GCL. Each of the exposure periods Pex(1), . . . , Pex(M) starts when the gate drive signal Vgcl changes from the power supply voltage VDD serving as the high-level voltage to the power supply voltage VSS serving as the low-level voltage during the reset period Prst. Each of the exposure periods Pex(1), . . . , Pex(M) ends when the gate drive signal Vgcl changes from the power supply voltage VSS to the power supply voltage VDD during the reading period Pdet. The lengths of the exposure period of the exposure periods Pex(1), . . . , Pex(M) are equal.

In the control method of exposure during non-selection of gate lines, a current flows correspondingly to the light irradiating the photodiode PD in each of the partial detection areas PAA during the exposure periods Pex {(1), . . . , (M)}. As a result, an electric charge is stored in each of the capacitive elements Ca.

At a time before the reading period Pdet starts, the control circuit 122 sets the reset signal RST2 to a low-level voltage. This operation stops operation of the reset circuit 17. The reset signal may be set to a high-level voltage only during the reset period Prst. During the reading period Pdet, the gate line drive circuit 15 sequentially supplies the gate drive signals Vgcl(1), . . . , Vgcl(M) to the gate lines GCL in the same manner as during the reset period Prst.

Figure 8:
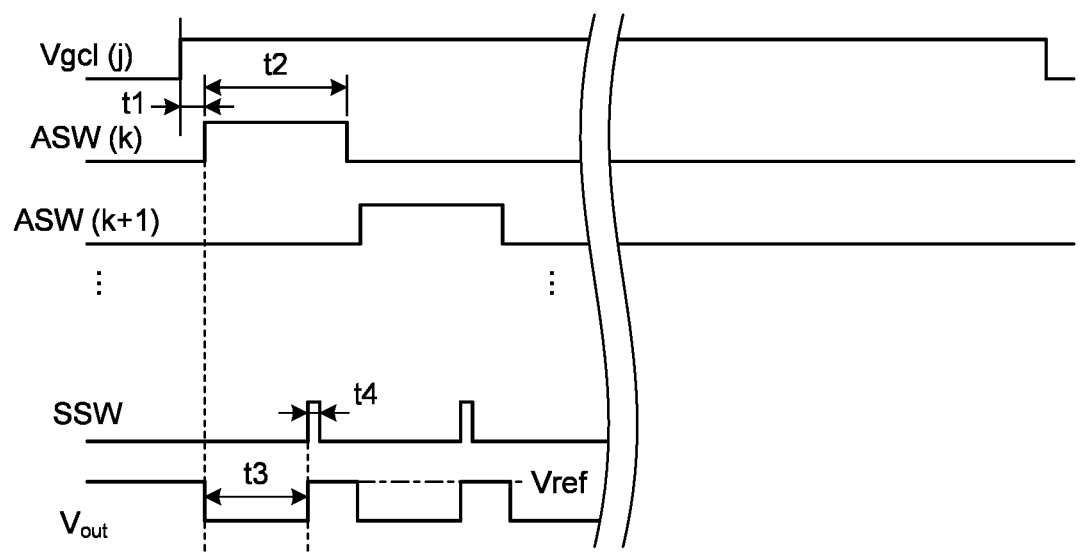
FIG. 8 is a timing waveform diagram illustrating an operation example during a reading period in FIG. 7.

Specifically, as illustrated in FIG. 8, the gate line drive circuit 15 supplies the gate drive signal Vgcl(1) at the high-level voltage (power supply voltage VDD) to the gate line GCL(1) during a row reading period VR(1). The control circuit 122 sequentially supplies selection signals ASW1, . . . , ASW6 to the signal line selection circuit 16 during a period in which the gate drive signal Vgcl(1) is at the high-level voltage (power supply voltage VDD). This operation sequentially or simultaneously couples the signal lines SGL of the partial detection areas PAA selected by the gate drive signal Vgcl(1) to the detection circuit 48. As a result, the detection signal Vdet for each of the partial detection areas PAA is supplied to the detection circuit 48.

In the same manner, the gate line drive circuit 15 supplies the gate drive signals Vgcl(2), . . . , Vgcl(M−1), Vgcl(M) at the high-level voltage to the gate lines GCL(2), . . . , GCL(M−1), GCL(M) during row reading periods VR(2), . . . , VR(M−1), VR(M), respectively. That is, the gate line drive circuit 15 supplies the gate drive signal Vgcl to the gate line GCL during each of the row reading periods VR(1), VR(2), . . . , VR(M−1), VR(M). The signal line selection circuit 16 sequentially selects each of the signal lines SGL based on the selection signal ASW in each period in which the gate drive signal Vgcl is set to the high-level voltage. The signal line selection circuit 16 sequentially couples each of the signal lines SGL to one detection circuit 48. Thus, the detection device 100 can output the detection signals Vdet of all the partial detection areas PAA to the detection circuit 48 during the reading period Pdet.

FIG. 8 is a timing waveform diagram illustrating an operation example during the reading period in FIG. 7. With reference to FIG. 8, the following describes the operation example during the row reading period VR that is a supply period of one of the gate drive signals Vgcl(j) in FIG. 7. In FIG. 7, the reference sign of the row reading period VR is assigned to the first gate drive signal Vgcl(1). The same applies to the other gate drive signals Vgcl(2), . . . , Vgcl(M). The index j is any one of the natural numbers 1 to M.

As illustrated in FIGS. 8 and 4, an output ($V_{out}$) of each of the third switching elements TrS has been reset to the reference potential (Vref) voltage in advance. The reference potential (Vref) serves as the reset voltage, and is set to, for example, 0.75 V. Then, the gate drive signal Vgcl(j) is set to a high level, and the first switching elements Tr of a corresponding row are turned on. Thus, each of the signal lines SGL in each row is set to a voltage corresponding to the electric charge stored in the capacity (capacitive element Ca) of the partial detection area PAA. After a period t1 elapses from a rising edge of the gate drive signal Vgcl(j), a period t2 starts in which the selection signal ASW(k) is set to a high level. After the selection signal ASW(k) is set to the high level and the third switching element TrS is turned on, the electric charge stored in the capacity (capacitive element Ca) of the partial detection area PAA coupled to the detection circuit 48 through the third switching element TrS changes the output ($V_{out}$) of the third switching element TrS (refer to FIG. 4) to a voltage corresponding to the electric charge stored in the capacity (capacitive element Ca) of the partial detection area PAA (period t3). In the example of FIG. 8, this voltage is reduced from the reset voltage as illustrated in the period t3. Then, after the switch SSW is turned on (period t4 during which an SSW signal is set to a high level), the electric charge stored in the capacity (capacitive element Ca) of the partial detection area PAA moves to the capacity (capacitive element Cf) of the detection signal amplifier 42 of the detection circuit 48, and the output voltage of the detection signal amplifier 42 is set to a voltage corresponding to the electric charge stored in the capacitive element Cf. At this time, the potential of the inverting input portion of the detection signal amplifier 42 is set to an imaginary short-circuit potential of an operational amplifier, and therefore, becomes the reference potential (Vref). The A/D converter 43 reads the output voltage of the detection signal amplifier 42. In the example of FIG. 8, waveforms of the selection signals ASW(k), ASW(k+1), . . . corresponding to the signal lines SGL of the respective columns are set to a high level to sequentially turn on the third switching elements TrS, and the same operation is sequentially performed. This operation sequentially reads the electric charges stored in the capacities (capacitive elements Ca) of the partial detection areas PAA coupled to the gate line GCL. ASW(k), ASW(k+1), . . . in FIG. 8 are, for example, any of ASW1 to ASW6 in FIG. 7.

Specifically, after the period t4 starts in which the switch SSW is on, the electric charge moves from the capacity (capacitive element Ca) of the partial detection area PAA to the capacity (capacitive element Cf) of the detection signal amplifier 42 of the detection circuit 48. At this time, the non-inverting input (+) of the detection signal amplifier 42 is supplied with the reference potential (Vref) voltage (for example, 0.75 V). As a result, the output ($V_{out}$) of the third switching element TrS is also set to the reference potential (Vref) voltage due to the imaginary short-circuit between input ends of the detection signal amplifier 42. The voltage of the capacitive element Cf is set to a voltage corresponding to the electric charge stored in the capacity (capacitive element Ca) of the partial detection area PAA at a location where the third switching element TrS is turned on in response to the selection signal ASW(k). After the output ($V_{out}$) of the third switching element TrS is set to the reference potential (Vref) voltage due to the imaginary short-circuit, the output of the detection signal amplifier 42 reaches a voltage corresponding to the capacitance of the capacitive element Cf, and this output voltage is read by the A/D converter 43. The voltage of the capacitive element Cf is, for example, a voltage between two electrodes provided on a capacitor constituting the capacitive element Cf.

The period t1 is, for example, 20 μs. The period t2 is, for example, 60 μs. The period t3 is, for example, 44.7 μs. The period t4 is, for example, 0.98 μs.

Although FIGS. 7 and 8 illustrate the example in which the gate line drive circuit 15 individually selects the gate line GCL, the present disclosure is not limited to this example. The gate line drive circuit 15 may simultaneously select a predetermined number (two or more) of the gate lines GCL, and sequentially supply the gate drive signals Vgcl to the gate lines GCL in units of the predetermined number of the gate lines GCL. The signal line selection circuit 16 may also simultaneously couple a predetermined number (two or more) of the signal lines SGL to one detection circuit 48. Moreover, the gate line drive circuit 15 may skip some of the gate lines GCL and scan the remaining ones.

Figure 9:
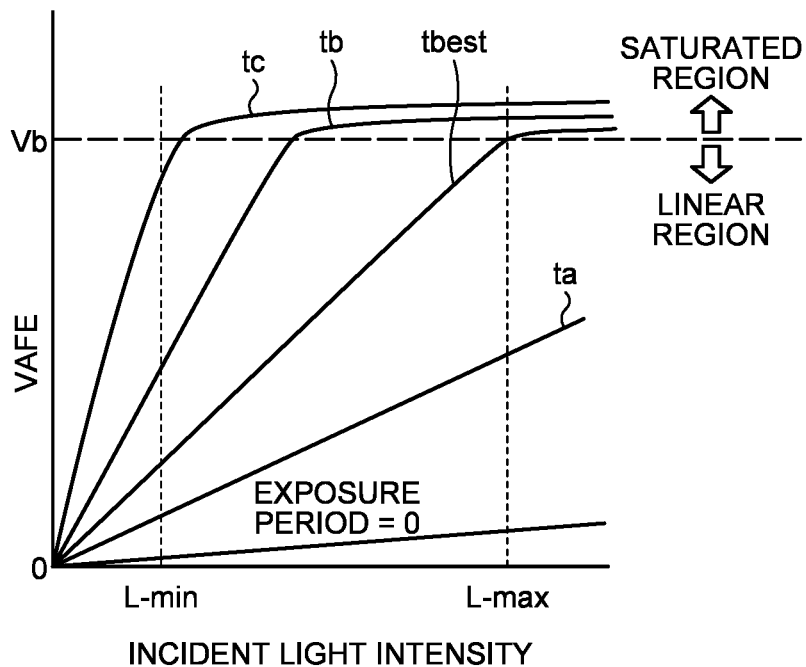
FIG. 9 is a graph schematically illustrating a relation between an output voltage that is output from a detection circuit and the intensity of incident light that is incident on a finger, in the detection device according to the embodiment.
Figure 10:
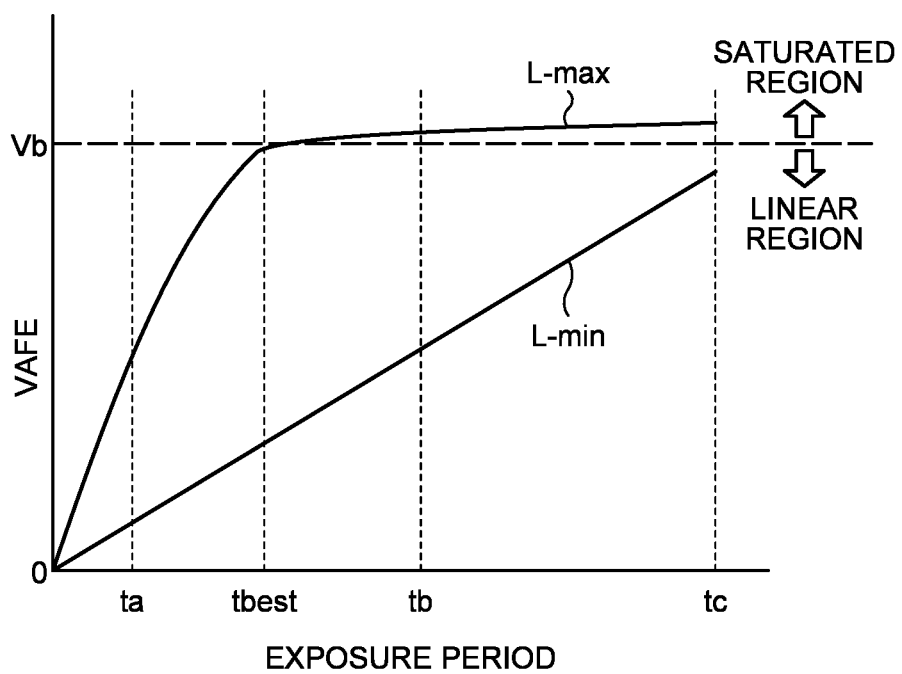
FIG. 10 is a graph schematically illustrating a relation between the output voltage that is output from the detection circuit and an exposure period, in the detection device according to the embodiment.

The following describes a method for adjusting the exposure period Pex of the detection device 100. FIG. 9 is a graph schematically illustrating a relation between the output voltage that is output from the detection circuit and the intensity of incident light that is incident on the finger, in the detection device according to the embodiment. FIG. 10 is a graph schematically illustrating a relation between the output voltage that is output from the detection circuit and the exposure period, in the detection device according to the embodiment. FIG. 9 illustrates the relation between the output voltage and the incident light intensity for each of the different exposure periods Pex (Pex=ta, tb, tc, and tbest). FIG. 10 illustrates the relation between the output voltage and the exposure period at each of a minimum incident light intensity L-min and a maximum incident light intensity L-max.

As illustrated in FIG. 9, the output voltage VAFE increases as the incident light intensity increases in any of the exposure periods Pex. The relation between the incident light intensity and the output voltage VAFE is different for each of the exposure periods Pex (Pex=ta, tb, tc, and tbest). More specifically, the detection device 100 has a linear region and a saturated region in the relation between the output voltage VAFE output from the detection circuit 48 and the incident light intensity. In the detection device 100, the gradient of the output voltage VAFE with respect to the incident light intensity in the saturated region is smaller than the gradient of the output voltage VAFE with respect to the incident light intensity in the linear region. In an optimal exposure period tbest, the output voltage VAFE has no curvature change point between the minimum incident light intensity L-min and the maximum incident light intensity L-max, and the difference between the output voltage VAFE at the minimum incident light intensity L-min and the output voltage VAFE at the maximum incident light intensity L-max is largest.

In the same manner, as illustrated in FIG. 10, the output voltage VAFE increases as the exposure period Pex increases. The detection device 100 has a linear region and a saturated region in the relation between the output voltage VAFE output from the detection circuit 48 and the exposure period Pex. At the maximum incident light intensity L-max, the gradient of the output voltage VAFE with respect to the exposure period Pex in the saturated region is smaller than the gradient of the output voltage VAFE with respect to the exposure period Pex in the linear region. At the minimum incident light intensity L-min, the output voltage VAFE is within the linear region from an exposure period 0 to an exposure period tc.

At the maximum incident light intensity L-max, the output voltage VAFE has a curvature change point between the linear region and the saturated region. In the following description, the output voltage VAFE that exhibits the curvature change point in the relation between the output voltage VAFE and the exposure period Pex is denoted as a reference output voltage Vb. The reference output voltage Vb is calculated by Expression (a) below. Vc denotes a charging voltage Vc of the capacitive element Ca. Ca denotes a capacitance value of the capacitive element Ca of the photodiode PD. Cf denotes a capacitance value of the capacitive element Cf of the detection signal amplifier 42.

$$Vb = Vc \times Ca/Cf \tag{a}$$

As illustrated in FIGS. 9 and 10, the exposure period Pex at the curvature change point of the output voltage VAFE at the maximum incident light intensity L-max can ideally be set as the optimal exposure period tbest based on the relations of the output voltage VAFE with the incident light intensity and the exposure period Pex. However, the relations of the output voltage VAFE with the incident light intensity and the exposure period Pex vary due to, for example, difference in subject person, difference in portion to be detected, or difference in light source. Therefore, the optimal exposure period tbest may shift from one object to be detected to another.

Figure 11:
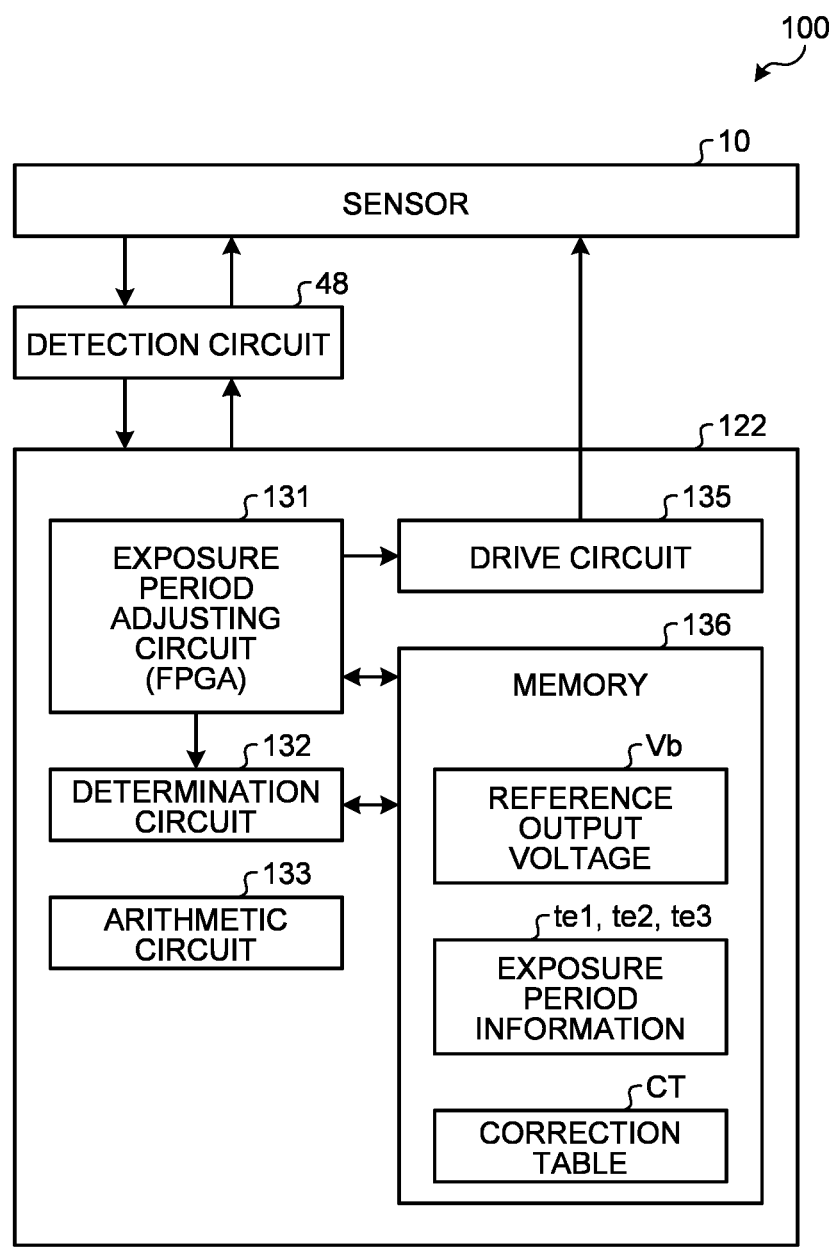
FIG. 11 is a block diagram illustrating a configuration example of the detection circuit of the detection device according to the embodiment.

FIG. 11 is a block diagram illustrating a configuration example of the detection circuit of the detection device according to the embodiment. As illustrated in FIG. 11, the control circuit 122 includes an exposure period adjusting circuit 131, a determination circuit 132, an arithmetic circuit 133, a drive circuit 135, and a memory 136.

The exposure period adjusting circuit 131 is a control circuit that supplies control signals to the determination circuit 132, the arithmetic circuit 133, the drive circuit 135, and the memory 136 to determine the optimal exposure period tbest. The exposure period adjusting circuit 131 is, for example, an FPGA.

The determination circuit 132 compares a first output voltage VAFE1 and a second output voltage VAFE2 with the reference output voltage Vb to determine whether the first output voltage VAFE1 and the second output voltage VAFE2 are in the linear region or the saturated region. Alternatively, the determination circuit 132 can compare a third output voltage VAFE3 with the reference output voltage Vb to determine whether the third output voltage VAFE3 is in the linear region or the saturated region. The determination circuit 132 is, for example, a comparator circuit. The first output voltage VAFE1, the second output voltage VAFE2, and the third output voltage VAFE3 are described later.

The arithmetic circuit 133 is a circuit that obtains, based on the information from the determination circuit 132, a correction table CT stored in advance in the memory 136, and calculates the optimal exposure period tbest.

The control circuit 122 performs the processing in the exposure period Pex described above in the newly set optimal exposure period tbest.

The drive circuit 135 is a circuit that drives the photodiode PD in the sensor 10 for the predetermined exposure period Pex based on a control signal from the exposure period adjusting circuit 131. Thus, the exposure period adjusting circuit 131 acquires the output voltage VAFE output from the detection circuit 48 and stores the information on the output voltage VAFE in the memory 136 such that the information on the output voltage VAFE is associated with the information on the exposure period Pex.

The memory 136 is a circuit that stores the information on the output voltage VAFE as described above. In addition, the memory 136 stores in advance the information on the reference output voltage Vb, the exposure period information, and the information on the correction table CT. The reference output voltage Vb is a voltage value at the curvature change point of the output voltage VAFE in the relation between the output voltage VAFE and the exposure period Pex illustrated in FIG. 10. In other words, the reference output voltage Vb is a voltage value between the linear region and the saturated region. The memory 136 also stores information on a first exposure period te1, a second exposure period te2, and a third exposure period te3 for driving the sensor 10, as the exposure period information. The first exposure period te1, the second exposure period te2, and the third exposure period te3 are information on the exposure period Pex that has been set in advance, for example, based on past results. The correction table CT is information indicating a relation between Case 1 to Case 4 described later and Expressions (1) to (3).

Figure 12:
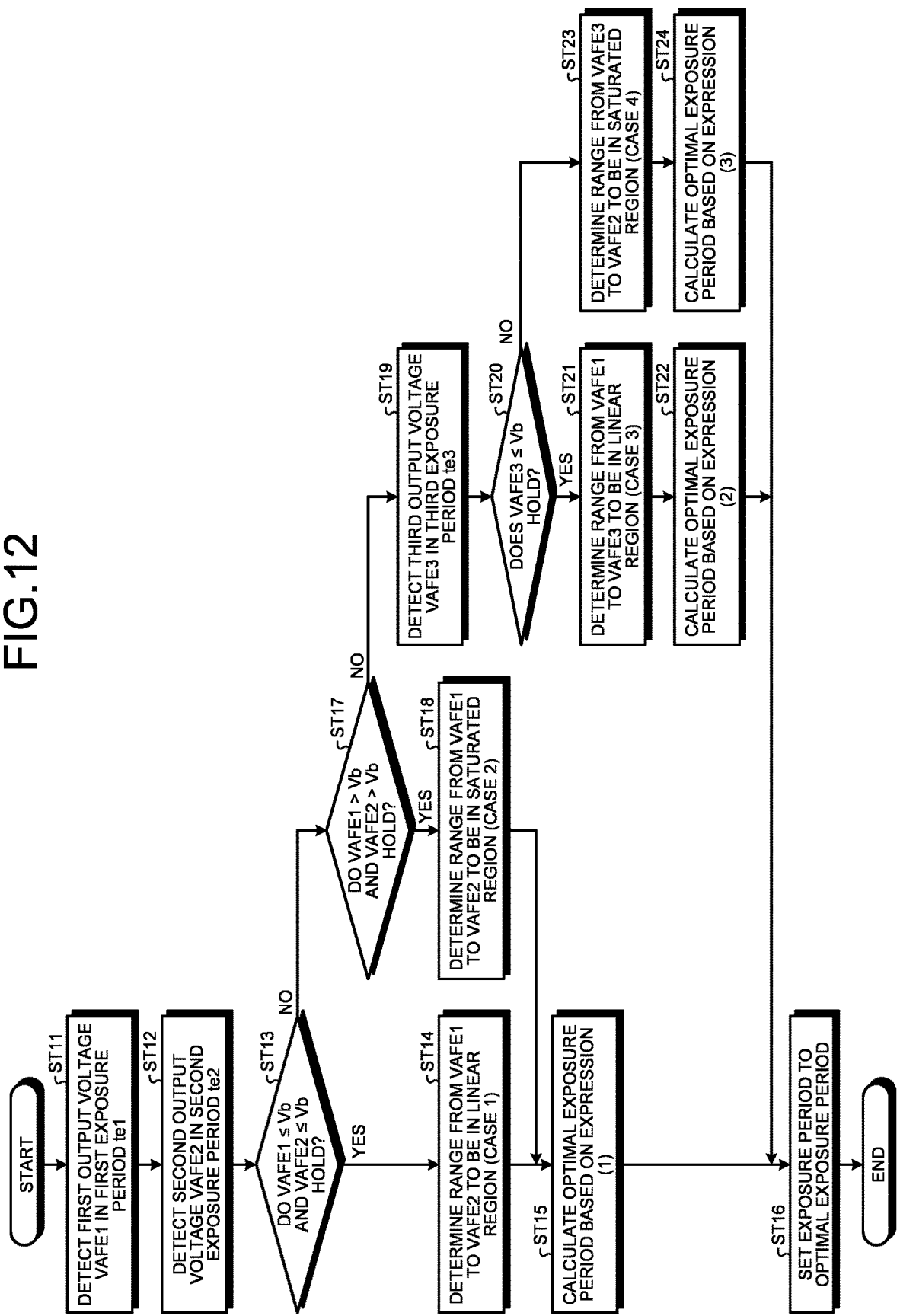
FIG. 12 is a flowchart for explaining an operation example of the detection device according to the embodiment.

The following describes the method for adjusting the exposure period Pex of the detection device 100, with reference to FIGS. 12 to 18. FIG. 12 is a flowchart for explaining an operation example of the detection device according to the embodiment.

As illustrated in FIG. 12, the exposure period adjusting circuit 131 drives the photodiodes PD in the first exposure period te1 to detect the first output voltage VAFE1 output from the detection circuit 48 (Step ST11). The first exposure period te1 is the information stored in advance in the memory 136 as described above. The exposure period adjusting circuit 131 scans the photodiodes PD in the sensor 10 to select, as the detection target, the photodiode PD that has output the maximum first output voltage VAFE1 in the first exposure period te1. The number of the photodiodes PD to be detected (detection targets) is not limited to one, and a plurality of the photodiodes PD may be selected. Alternatively, the number of the photodiodes PD as the detection targets may be preset and may be one or more.

Then, the exposure period adjusting circuit 131 drives the photodiodes PD in the second exposure period te2 to detect the second output voltage VAFE2 output from the detection circuit 48 (Step ST12). The second exposure period te2 is a period longer than the first exposure period te1, and the second output voltage VAFE2 is a voltage value higher than the first output voltage VAFE1.

Figure 13:
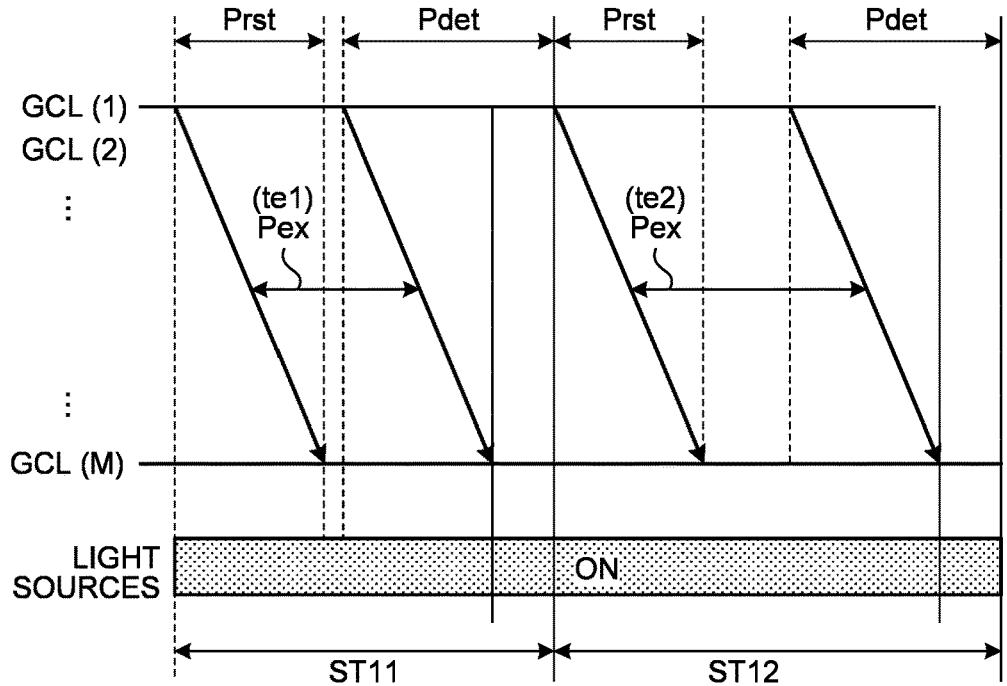
FIG. 13 is an explanatory diagram for explaining driving of the sensor and light sources of the detection device at Step ST11 and Step ST12 illustrated in FIG. 12.

FIG. 13 is an explanatory diagram for explaining the driving of the sensor and the light sources of the detection device at Step ST11 and Step ST12 illustrated in FIG. 12. As illustrated in FIG. 13, at each of Steps ST11 and ST12, the detection device 100 performs the processing in the reset period Prst, the exposure periods Pex {(1), . . . , (M)}, and the reading period Pdet described above. In the reset period Prst and the reading period Pdet, the gate line drive circuit 15 sequentially scans the gate lines from the gate line GCL(1) to the gate line GCL(M). The exposure period Pex (second exposure period te2) at Step ST12 is set longer than the exposure period Pex (first exposure period te1) at Step ST11.

In each of the periods at Step ST11 and Step ST12, the light sources (first light sources 61 or second light sources 62) are continuously lit. That is, the length of the exposure period Pex is controlled by turning on and off each of the TFTs, such as the first switching element Tr and the switching elements included in the gate line drive circuit 15. However, the present disclosure is not limited thereto. The exposure period adjusting circuit 131 can control the lighting and non-lighting of the light sources based on the exposure period Pex. In the operation illustrated in FIG. 13, the exposure period Pex serves as an actual exposure period. The "actual exposure period" is not a period during which the light source emits light but a period during which the electric charges corresponding to the light received by the photodiodes PD are stored in the respective capacitive elements Ca in the lighting period of the light source.

Figure 14:
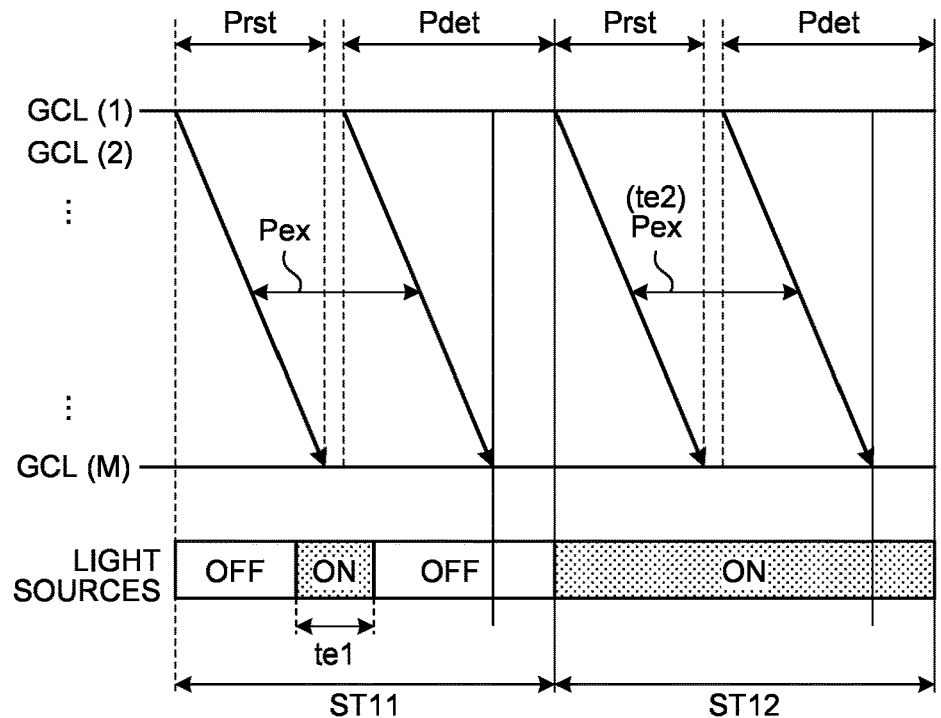
FIG. 14 is an explanatory diagram for explaining the driving of the sensor and the light sources of a detection device according to a second modification.

FIG. 14 is an explanatory diagram for explaining the driving of the sensor and the light sources of a detection device according to a second modification. As illustrated in FIG. 14, at Step ST11, the exposure period adjusting circuit 131 turns on (lights up) the light sources only in the first exposure period te1 of the exposure period Pex, and turns off (lights off) the light sources in periods other than the first exposure period te1. In other words, at Step ST11, the exposure period Pex includes a period during which the light sources are on (lit) and a period during which the light sources are off (unlit). In this case, elements to be detected are elements for which the entire lighting period of the light sources is included in the exposure period Pex.

At Step ST12, the exposure period adjusting circuit 131 continuously turns on (lights up) the light sources. Thus, the exposure period adjusting circuit 131 can detect the output voltages VAFE in the different first and second exposure periods te1 and te2 by controlling the turning on and off of the light sources according to the first exposure period te1 while applying the same drive to the TFTs such as the first switching element Tr at Step ST11 and Step ST12.

While FIG. 14 illustrates the control of the light sources at Step ST11, the control may be applied to a case of performing the exposure at the short exposure period Pex in detecting the object to be detected at the set optimal exposure period tbest. That is, the control circuit 122 may drive the light sources so as to have a period in which the light sources are lit up in accordance with the optimal exposure period tbest and a period in which the light sources are not lit up, in the exposure period Pex between the reset period Prst and the readout period Pdet illustrated in FIG. 7.

Referring back to FIG. 12, the determination circuit 132 then compares the first output voltage VAFE1 and the second output voltage VAFE2 with the reference output voltage Vb (Step ST13).

If the first output voltage VAFE1 is equal to or lower than the reference output voltage Vb and the second output voltage VAFE2 is equal to or lower than the reference output voltage Vb (Yes at Step ST13), the determination circuit 132 determines that a range from the first output voltage VAFE1 to the second output voltage VAFE2 is in the linear region (Step ST14). In the following description, "Case 1" denotes the case where the range from the first output voltage VAFE1 to the second output voltage VAFE2 is in the linear region.

Figure 15:
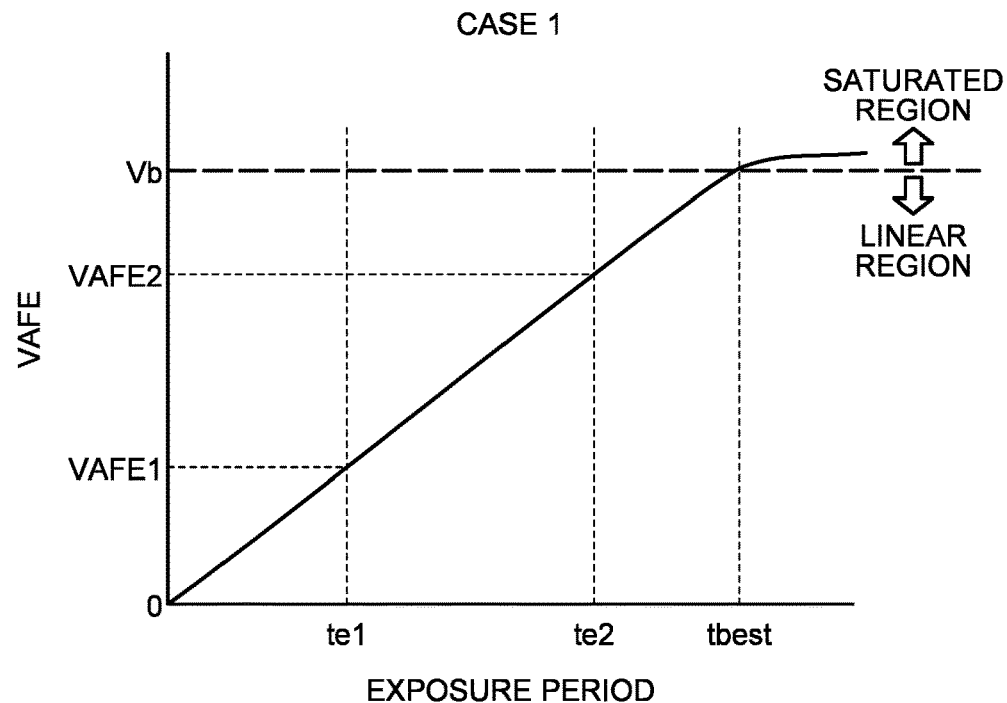
FIG. 15 is a graph schematically illustrating the relation between the output voltage that is output from the detection circuit and the exposure period in Case 1.

FIG. 15 is a graph schematically illustrating the relation between the output voltage that is output from the detection circuit and the exposure period in Case 1. To facilitate understanding, FIG. 15 graphically illustrates the relation between the output voltage VAFE and the exposure period Pex over a range from the linear region to the saturated region. Through Steps ST11 to ST14, the exposure period adjusting circuit 131 has acquired the information on the two output values of the first output voltage VAFE1 and the second output voltage VAFE2 acquired from the detection circuit 48 and the information on the two exposure periods of the first exposure period te1 and the second exposure period te2 such that the information on the two output values and the information on the two exposure periods are associated with each other.

The arithmetic circuit 133 acquires the correction information for Case 1 from the correction table CT in the memory 136 and calculates the optimal exposure period tbest based on Expression (1) below (Step ST15).

$$tbest=(te2-te1)\times(Vb-VAFE1)/(VAFE2-VAFE1)+te1 \quad (1)$$

In other words, as illustrated in FIG. 15, the arithmetic circuit 133 sets, as the optimal exposure period tbest, the exposure period at an intersection between a straight line connecting the first output voltage VAFE1 to the second output voltage VAFE2 in the linear region and the reference output voltage Vb, in the relation between the output voltage VAFE and the exposure period Pex. In Case 1, the optimal exposure period tbest is longer than the first exposure period te1 and the second exposure period te2. The optimal exposure period tbest of photodiode PD is the exposure period Pex that is substantially an intersection (curvature change point) between a correlation straight line indicating the relation between the output voltage VAFE and the exposure period Pex in the linear region (hereinafter, referred to as a first correlation straight line) and a correlation straight line indicating the relation between the output voltage VAFE and the exposure period Pex in the saturated region (hereinafter, referred to as a second correlation straight line).

As illustrated in FIG. 12, the exposure period adjusting circuit 131 sets the exposure period Pex to the calculated optimal exposure period tbest (Step ST16).

If, at Step ST13, the condition that the first output voltage VAFE1 is equal to or lower than the reference output voltage Vb and the second output voltage VAFE2 is equal to or lower than the reference output voltage Vb is not satisfied (No at Step ST13), the determination circuit 132 compares again the first output voltage VAFE1 and the second output voltage VAFE2 with the reference output voltage Vb (Step ST17).

If the first output voltage VAFE1 is higher than the reference output voltage Vb and the second output voltage VAFE2 is higher than the reference output voltage Vb (Yes at Step ST17), the determination circuit 132 determines that the range from the first output voltage VAFE1 to the second output voltage VAFE2 is in the saturated region (Step ST18). In the following description, "Case 2" denotes the case where the range from the first output voltage VAFE1 to the second output voltage VAFE2 is in the saturated region.

The arithmetic circuit 133 acquires the correction information for Case 2 from the correction table CT in the memory 136. Also in Case 2, the optimal exposure period tbest is calculated based on Expression (1) above in the same manner as at Step ST15.

Figure 16:
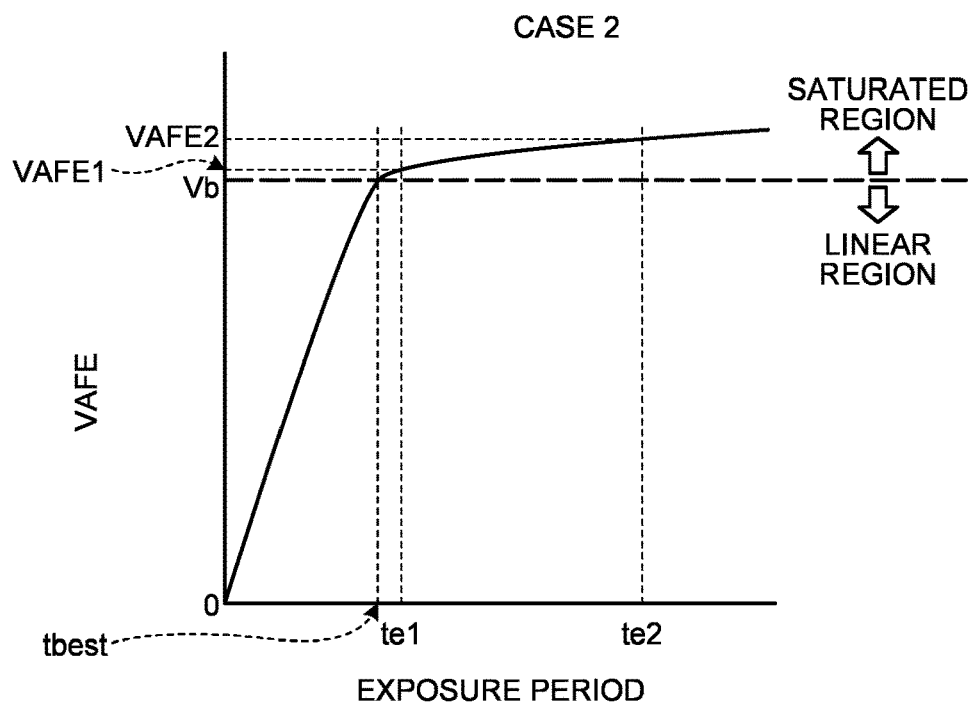
FIG. 16 is a graph schematically illustrating the relation between the output voltage that is output from the detection circuit and the exposure period in Case 2.

FIG. 16 is a graph schematically illustrating the relation between the output voltage that is output from the detection circuit and the exposure period in Case 2. As illustrated in FIG. 16, the arithmetic circuit 133 sets, as the optimal exposure period tbest, the exposure period at an intersection between a straight line connecting the first output voltage VAFE1 to the second output voltage VAFE2 in the saturated region and the reference output voltage Vb, in the relation between the output voltage VAFE and the exposure period Pex. In Case 2, the optimal exposure period tbest is shorter than the first exposure period te1 and the second exposure period te2.

If the condition that the first output voltage VAFE1 is higher than the reference output voltage Vb and the second output voltage VAFE2 is higher than the reference output voltage Vb is not satisfied (No at Step ST17), the exposure period adjusting circuit 131 drives the photodiodes PD in the third exposure period te3 to detect the third output voltage VAFE3 output from the detection circuit 48 (Step ST19).

In other words, if the first output voltage VAFE1 is lower than the reference output voltage Vb and the second output voltage VAFE2 is higher than the reference output voltage Vb, the exposure period adjusting circuit 131 performs the processing starting at Step ST19. The processing starting at Step ST19 indicates a method for adjusting the optimal exposure period tbest in a case where the curvature change point is located between the first output voltage VAFE1 and the second output voltage VAFE2 in the graph illustrating the relation between the output voltage VAFE and the exposure period Pex.

The third exposure period te3 is a period that is set in advance between the first exposure period te1 and the second exposure period te2. Specifically, the third exposure period te3 is longer than the first exposure period te1 and shorter than the second exposure period te2. For example, the third exposure period te3 is set so that te3=(te1+te2)/2. Similarly, the third output voltage VAFE3 is a voltage value between the first output voltage VAFE1 and the second output voltage VAFE2. The third output voltage VAFE3 is a voltage value higher than the first output voltage VAFE1 and lower than the second output voltage VAFE2.

Then, the determination circuit 132 compares the third output voltage VAFE3 with the reference output voltage Vb (Step ST20).

If the third output voltage VAFE3 is equal to or lower than the reference output voltage Vb (Yes at Step ST20), the determination circuit 132 determines that a range from the first output voltage VAFE1 to the third output voltage VAFE3 is in the linear region (Step ST21). In the following description, "Case 3" denotes the case where the range from the first output voltage VAFE1 to the third output voltage VAFE3 is in the linear region.

Figure 17:
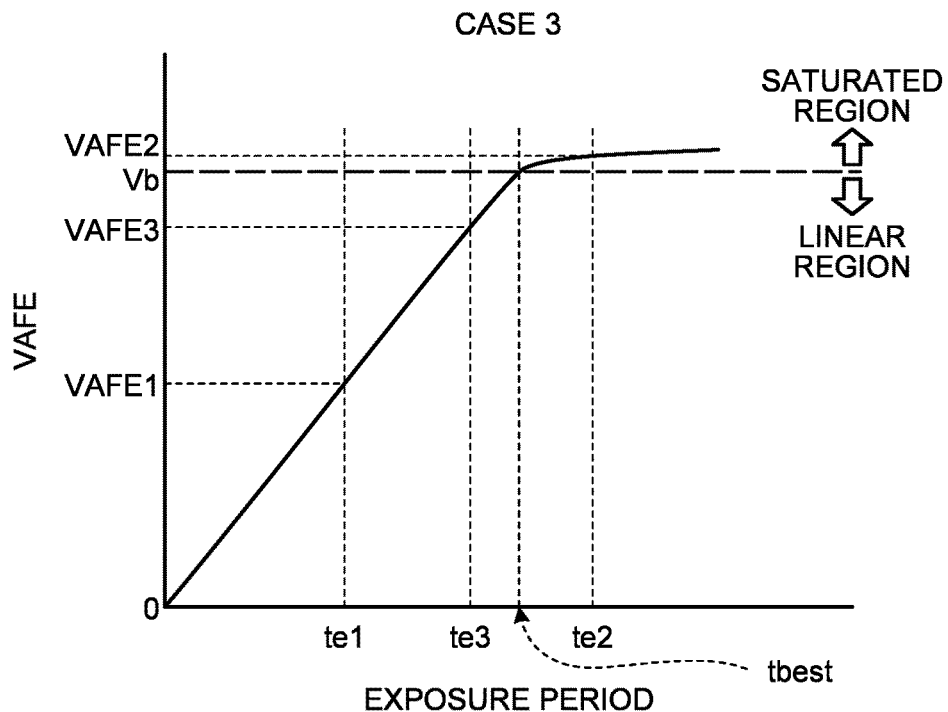
FIG. 17 is a graph schematically illustrating the relation between the output voltage that is output from the detection circuit and the exposure period in Case 3.

FIG. 17 is a graph schematically illustrating the relation between the output voltage that is output from the detection circuit and the exposure period in Case 3. To facilitate understanding, FIG. 17 graphically illustrates the relation between the output voltage VAFE and the exposure period Pex over the range from the linear region to the saturated region. By Step ST21, the exposure period adjusting circuit 131 has acquired the information on the three output values of the first output voltage VAFE1, the second output voltage VAFE2, and the third output voltage VAFE3 acquired from the detection circuit 48 and the information on the three exposure periods of the first exposure period te1, the second exposure period te2, and the third exposure period te3 such that the information on the three output values and the information on the three exposure periods are associated with each other.

The arithmetic circuit 133 acquires the correction information for Case 3 from the correction table CT in the memory 136 and calculates the optimal exposure period tbest based on Expression (2) below (Step ST22).

$$\text{tbest} = (te3 - te1) \times (Vb - \text{VAFE1}) / (\text{VAFE3} - \text{VAFE1}) + te1 \qquad (2)$$

In other words, as illustrated in FIG. 17, the arithmetic circuit 133 sets, as the optimal exposure period tbest, the exposure period at an intersection between a straight line connecting the first output voltage VAFE1 to the third output voltage VAFE3 in the linear region and the reference output voltage Vb, in the relation between the output voltage VAFE and the exposure period Pex. In Case 3, the optimal exposure period tbest is a period between the third exposure period te3 and the second exposure period te2. In other words, in Case 3, a range from the third output voltage VAFE3 to the second output voltage VAFE2 is located across from the linear region to the saturated region, and the exposure time at the curvature change point between the third output voltage VAFE3 and the second output voltage VAFE2 serves as the optimal exposure period tbest.

If the third output voltage VAFE3 is higher than the reference output voltage Vb (No at Step ST20), the determination circuit 132 determines that the range from the third output voltage VAFE3 to the second output voltage VAFE2 is in the saturated region (Step ST23). In the following description, "Case 4" denotes the case where the range from the third output voltage VAFE3 to the second output voltage VAFE2 is in the saturated region.

Figure 18:
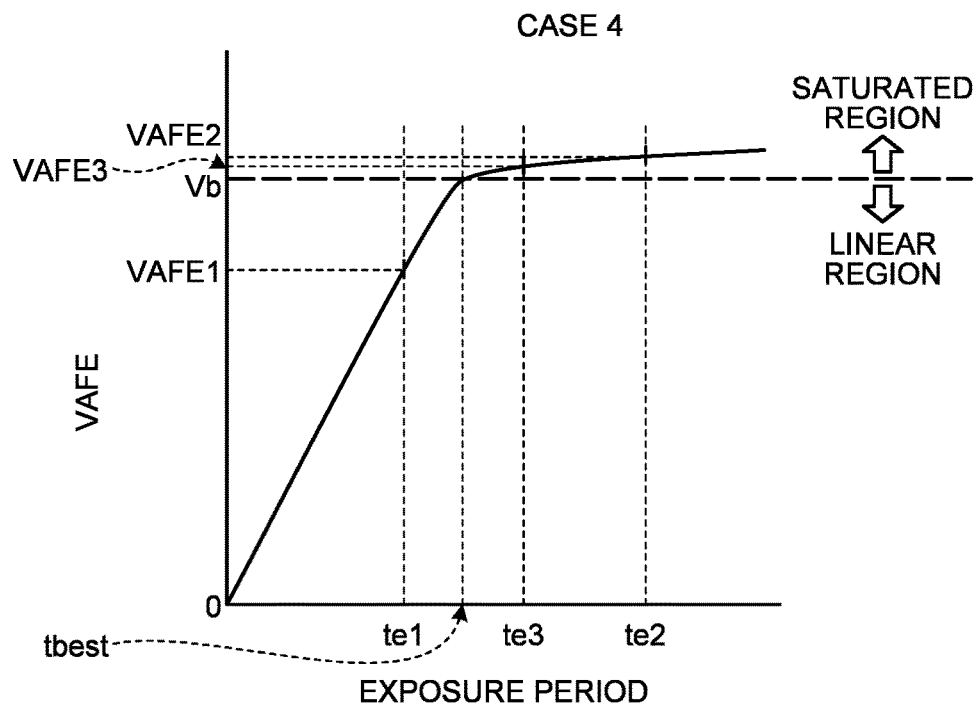
FIG. 18 is a graph schematically illustrating the relation between the output voltage that is output from the detection circuit and the exposure period in Case 4.

FIG. 18 is a graph schematically illustrating the relation between the output voltage that is output from the detection circuit and the exposure period in Case 4. In Case 4, the exposure period adjusting circuit 131 has acquired the information on the three output values of the first output voltage VAFE1, the second output voltage VAFE2, and the third output voltage VAFE3 acquired from the detection circuit 48 and the information on the three exposure periods of the first exposure period te1, the second exposure period te2, and the third exposure period te3 such that the information on the three output values and the information on the three exposure periods are associated with each other.

The arithmetic circuit 133 acquires the correction information for Case 4 from the correction table CT in the memory 136 and calculates the optimal exposure period tbest based on Expression (3) below (Step ST24).

$$\text{tbest} = (te2 - te3) \times (Vb - \text{VAFE3}) / (\text{VAFE2} - \text{VAFE3}) + te3 \qquad (3)$$

In other words, as illustrated in FIG. 18, the arithmetic circuit 133 sets, as the optimal exposure period tbest, the exposure period at an intersection between a straight line connecting the third output voltage VAFE3 to the second output voltage VAFE2 in the saturated region and the reference output voltage Vb, in the relation between the output voltage VAFE and the exposure period Pex. In Case 4, the optimal exposure period tbest is a period between the first exposure period te1 and the third exposure period te3. In other words, in Case 4, the range from the first output voltage VAFE1 to the third output voltage VAFE3 is located across from the linear region to the saturated region, and the exposure time at the curvature change point between the first output voltage VAFE1 and the third output voltage VAFE3 serves as the optimal exposure period tbest.

The method for adjusting the optimal exposure period tbest illustrated in FIGS. 12 to 18 is merely an example and may be changed as appropriate. For example, in FIG. 12, Steps ST13, ST17, and ST20 are separately explained in order to facilitate understanding. However, the determination circuit 132 may determine which of Case 1 to Case 4 is applicable, by performing one determination operation. Although the third output voltage VAFE3 is detected at Step ST19 after Step ST17, the present disclosure is not limited to this method. The exposure period adjusting circuit 131 may acquire in advance the information on the three output values of the first output voltage VAFE1, the second output voltage VAFE2, and the third output voltage VAFE3.

As described above, the detection device 100 includes the photodiodes PD, the light sources (first light sources 61) that emit the light to the object to be detected, the detection circuit 48 that detects the detection signals output from the photodiodes PD, and the exposure period adjusting circuit 131 that determines the exposure period Pex of the photodiodes PD. In the relation between the output value (output voltage VAFE) output from the detection circuit 48 and the exposure period Pex, the linear region and the saturated region are included, and the gradient of the output value (output voltage VAFE) with respect to the exposure period Pex in the saturated region is smaller than the gradient of the output value (output voltage VAFE) with respect to the exposure period Pex in the linear region. The exposure period adjusting circuit 131 determines the exposure period (optimal exposure period tbest) based on a first output value (first output voltage VAFE1) output from the detection circuit 48 in the first exposure period te1, a second output value (second output voltage VAFE2) output from the detection circuit 48 in the second exposure period te2, and the reference output voltage (reference output voltage Vb) set in advance.

The exposure period adjusting circuit 131 sets, as the optimal exposure period tbest of the photodiodes PD, the exposure period Pex that is substantially the intersection between the first correlation straight line and the second correlation straight line. As described above, the first correlation straight line is a line indicating the relation between the output value (output voltage VAFE) and the exposure period Pex in the linear region. The second correlation straight line is a line indicating the relation between the output value (output voltage VAFE) and the exposure period Pex in the saturated region.

In the detection device 100, the exposure period adjusting circuit 131 sets, as the optimal exposure period tbest, the exposure period Pex at the curvature change point of the output value (output voltage VAFE), in the relation between the output value (output voltage VAFE) and the exposure period Pex.

With this method, the exposure period adjusting circuit 131 can set the optimal exposure period tbest by scanning the photodiodes PD at least twice. More specifically, the exposure period adjusting circuit 131 can calculate the optimal exposure period tbest based on the information on the two output values of the first output voltage VAFE1 and the second output voltage VAFE2 acquired from the detection circuit 48, the information on the two exposure periods of the first exposure period te1 and the second exposure period te2, and the reference output voltage Vb set in advance. This method allows the exposure period adjusting circuit 131 to set the optimal exposure period tbest for each of the different objects to be detected in a shorter time and more easily than a method of capturing images at several different lengths of the exposure period Pex and obtaining the optimal exposure period by viewing the captured images.

While the preferred embodiments of the present disclosure have been described above, the present disclosure is not limited to the embodiments described above. The content disclosed in the embodiments is merely an example, and can be variously modified within the scope not departing from the gist of the present disclosure. Any modifications appropriately made within the scope not departing from the gist of the present disclosure also naturally belong to the technical scope of the present disclosure. At least one of various omissions, substitutions, and changes of the components can be made without departing from the gist of the embodiments and the modifications described above.

What is claimed is:

1. A detection device comprising:
   a plurality of photodiodes;
   a light source configured to emit light to an object to be detected;
   a detection circuit configured to detect detection signals output from the photodiodes; and
   an exposure period adjusting circuit configured to determine an exposure period of the photodiodes, wherein
   a relation between an output value output from the detection circuit and the exposure period comprises a linear region and a saturated region, and a gradient of the output value with respect to the exposure period in the saturated region is smaller than a gradient of the output value with respect to the exposure period in the linear region, and
   the exposure period adjusting circuit is configured to determine the exposure period based on a first output value output from the detection circuit in a first exposure period, a second output value output from the detection circuit in a second exposure period, and a reference output value set in advance.

2. The detection device according to claim 1, wherein the exposure period adjusting circuit is configured to set, as an optimal exposure period of the photodiodes, the exposure period that is substantially an intersection between a correlation straight line indicating a relation between the output value and the exposure period in the linear region and a correlation straight line indicating a relation between the output value and the exposure period in the saturated region.

3. The detection device according to claim 1, further comprising a memory configured to store information on the reference output value.

4. The detection device according to claim 1, wherein the exposure period adjusting circuit is configured to set, as an optimal exposure period, the exposure period at an intersection between a straight line connecting the first output value to the second output value and the reference output value in the relation between the output value and the exposure period in a case where the first output value and the second output value are equal to or lower than the reference output value.

5. The detection device according to claim 1, wherein the exposure period adjusting circuit is configured to set, as an optimal exposure period, the exposure period at an intersection between a straight line connecting the first output value to the second output value and the reference output value in the relation between the output value and the exposure period in a case where the first output value and the second output value are higher than the reference output value.

6. The detection device according to claim 1, wherein
   the exposure period adjusting circuit is configured to
      acquire a third output value output from the detection circuit in a third exposure period between the first exposure period and the second exposure period in a case where the first output value is lower than the reference output value and the second output value is higher than the reference output value, and
      set, as an optimal exposure period, the exposure period at an intersection between a straight line connecting the first output value to the third output value and the reference output value in the relation between the output value and the exposure period in a case where the third output value is equal to or lower than the reference output value.

7. The detection device according to claim 1, wherein
   the exposure period adjusting circuit is configured to
      acquire a third output value output from the detection circuit in a third exposure period between the first exposure period and the second exposure period in a case where the first output value is lower than the reference output value and the second output value is higher than the reference output value, and
      set, as an optimal exposure period, the exposure period at an intersection between a straight line connecting the third output value to the second output value and the reference output value in the relation between the output value and the exposure period in a case where the third output value is higher than the reference output value.

8. The detection device according to claim 1, further comprising a capacitor provided as an equivalent circuit in parallel with each of the photodiodes, wherein
   the detection circuit is configured to read an electric charge of the capacitor as the output value.

9. The detection device according to claim 1, wherein
   a reset period, the exposure period, and a reading period are provided, and
   the exposure period between the reset period and the reading period comprises a period in which the light source is lit up and a period in which the light source is not lit up.

10. The detection device according to claim 1, wherein the exposure period adjusting circuit is configured to scan the photodiodes in the first exposure period and select one of the photodiodes that has output the largest first output value as a photodiode to be detected.

11. A detection device comprising:
a plurality of photodiodes;
a light source configured to emit light to an object to be detected;
a detection circuit configured to detect detection signals output from the photodiodes; and
an exposure period adjusting circuit configured to determine an exposure period of the photodiodes, wherein
a relation between an output value output from the detection circuit and the exposure period comprises a linear region and a saturated region, and a gradient of the output value with respect to the exposure period in the saturated region is smaller than a gradient of the output value with respect to the exposure period in the linear region, and
the exposure period adjusting circuit is configured to set, as an optimal exposure period, the exposure period at a curvature change point of the output value in the relation between the output value output from the detection circuit and the exposure period.

* * * * *